(12) United States Patent
Pathak et al.

(10) Patent No.: US 12,571,346 B2
(45) Date of Patent: * Mar. 10, 2026

(54) SYSTEMS AND METHODS FOR CARBON DIOXIDE-BASED ENERGY STORAGE AND POWER GENERATION

(71) Applicant: EarthEn Energy Inc., Chandler, AZ (US)

(72) Inventors: Manas Pathak, Chandler, AZ (US); Palash Panja, Salt Lake City, UT (US)

(73) Assignee: EarthEn Energy Inc., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/938,072

(22) Filed: Nov. 5, 2024

(65) Prior Publication Data

US 2025/0059912 A1 Feb. 20, 2025

Related U.S. Application Data

(63) Continuation of application No. 18/525,484, filed on Nov. 30, 2023, now Pat. No. 12,173,647.

(60) Provisional application No. 63/504,794, filed on May 30, 2023, provisional application No. 63/503,465, filed on May 20, 2023, provisional application No. 63/502,820, filed on May 17, 2023, provisional application No. 63/502,814, filed on May 17, 2023, provisional application No. 63/483,763, filed on Feb. 8, 2023, provisional application No. 63/480,446, filed on Jan. 18, 2023.

(51) Int. Cl.
*F02C 6/04* (2006.01)
*F03G 4/00* (2006.01)

(52) U.S. Cl.
CPC ................ *F02C 6/04* (2013.01); *F03G 4/063* (2021.08); *F05D 2220/76* (2013.01); *F05D 2260/42* (2013.01)

(58) Field of Classification Search
CPC ........ F02C 6/04; F03G 4/063; F05D 2220/76; F05D 2260/42; F01K 3/12; F01K 3/006
See application file for complete search history.

(56) References Cited

U.S. PATENT DOCUMENTS 5,634,340 A 6/1997 Grennan
8,627,665 B2 1/2014 Ruer
(Continued)

OTHER PUBLICATIONS

International Search Report and Written Opinion for International Patent Application No. PCT/US2023/081886, dated Mar. 19, 2024.

*Primary Examiner* — Hoang M Nguyen
(74) *Attorney, Agent, or Firm* — Goodwin Procter LLP

(57) ABSTRACT

Systems and methods for carbon dioxide-based energy storage and power generation are described. An example system is presented that includes a compressor operable to receive supercritical carbon dioxide (sCO$_2$) and produce compressed sCO$_2$, one or more thermal energy storage (TES) units operable to heat the compressed sCO$_2$, a turbine operable to receive the heated and compressed sCO$_2$ and output an sCO$_2$ exhaust, and at least one of a generator or a propeller coupled to the turbine, where the generator is operable to produce electricity and the propeller is operable to produce thrust.

22 Claims, 14 Drawing Sheets

(56) References Cited

U.S. PATENT DOCUMENTS

| | | | |
|---|---|---|---|
| 8,656,712 B2 | 2/2014 | Howes et al. | |
| 11,569,663 B1 | 1/2023 | Pathak | |
| 12,173,647 B2 * | 12/2024 | Pathak | F03G 4/063 |
| 2012/0186219 A1 * | 7/2012 | Gurin | C10G 3/42 |
| | | | 60/659 |
| 2016/0108761 A1 | 4/2016 | Frazier et al. | |
| 2017/0016577 A1 | 1/2017 | Sinatov et al. | |
| 2018/0179917 A1 | 6/2018 | Apte et al. | |
| 2018/0187597 A1 | 7/2018 | Apte et al. | |
| 2019/0093556 A1 | 3/2019 | Wagner et al. | |
| 2019/0277196 A1 | 9/2019 | Ortmann et al. | |
| 2022/0145778 A1 | 5/2022 | Spadacini | |

* cited by examiner

1400

1410

1415

1400

1410

A

1400

1405

SYSTEMS AND METHODS FOR CARBON DIOXIDE-BASED ENERGY STORAGE AND POWER GENERATION

CROSS-REFERENCE TO RELATED APPLICATIONS

This application is a continuation of U.S. patent application Ser. No. 18/525,484, filed on Nov. 30, 2023, which claims priority to and benefit of U.S. Provisional Patent Application No. 63/480,446, filed on Jan. 18, 2023, U.S. Provisional Patent Application No. 63/483,763, filed on Feb. 8, 2023, U.S. Provisional Patent Application No. 63/502, 814, filed on May 17, 2023, U.S. Provisional Patent Application No. 63/502,820, filed on May 17, 2023, U.S. Provisional Patent Application No. 63/503,465, filed on May 20, 2023, and U.S. Provisional Patent Application No. 63/504, 794, filed on May 30, 2023, the entire disclosure of each of which is hereby incorporated by reference.

FIELD OF TECHNOLOGY

The present disclosure relates to thermo-mechanical energy systems, and more particularly, to scalable, low cost, carbon neutral, energy generation and thermal energy storage systems that utilize supercritical carbon dioxide ($sCO_2$).

BACKGROUND

Currently available energy storage solutions, such as lithium-ion batteries, compressed air storage, gravity storage, and flow batteries face several technical challenges, including storage degradation, raw material shortages, and/or land constraints. Supercritical carbon dioxide ($sCO_2$) energy storage systems have been explored as an alternative to existing energy storage systems. $sCO_2$ exhibits high density and volumetric heat capacity compared to other working fluids, such as steam, which means system components for $sCO_2$ systems (e.g., turbines, storage tanks, and pumps) can be reduced considerably in size, resulting in smaller overall system footprints and lower capital costs. The unique properties of $sCO_2$ make it an attractive working fluid in a variety of applications, including power generation and heat transfer processes.

In general, a supercritical fluid (SCF) is a fluid at a temperature and pressure above its critical point, where distinct liquid and gas phases do not exist. Near the critical point, small changes in pressure or temperature can result in large changes in density, allowing many properties of a supercritical fluid to be fine-tuned. $sCO_2$ is a fluid state of carbon dioxide ($CO_2$) above its critical temperature and critical pressure. $CO_2$ behaves as a gas in air at standard temperature and pressure (STP), or as a solid (e.g., dry ice) when cooled and/or pressurized sufficiently. When the temperature and pressure are both increased from STP to be at or above the critical point, $CO_2$ can adopt properties falling between a gas and a liquid. More specifically, $CO_2$ behaves as a supercritical fluid above its critical temperature (304.128 K, 30.978° C., 87.760° F.) and critical pressure (7.377 MPa, 72.808 atm, 1,070 psi, 73.773 bar). $sCO_2$ can expand to fill a container like a gas but can have a density like that of a liquid (e.g., 0.469 $g/cm^3$ at the critical point), which is higher than that of steam (e.g., 0.322 $g/cm^3$).

The unique properties of $sCO_2$ present advantages for closed-loop power generation and can be applied to various power generation applications. Power generation systems that use traditional air Brayton and steam Rankine cycles can be upgraded to $sCO_2$ to increase efficiency and power output. For example, due to its excellent heat transfer properties, $sCO_2$ can efficiently transfer heat from the heat source (e.g., nuclear reactors, concentrated solar power systems, or waste heat from industrial processes) to the power generation process. Further, due to its superior thermal stability and non-flammability, direct heat exchange from high temperature sources is possible with $sCO_2$, permitting higher working fluid temperatures and therefore higher cycle efficiency. Unlike two-phase flow, the single-phase nature of $sCO_2$ eliminates the necessity of a heat input for phase change (e.g., required for water to steam conversion), which also reduces associated thermal fatigue and corrosion.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

In various examples, the subject matter described herein relates to thermo-mechanical $CO_2$-based systems for storing thermal and mechanical energy and/or harnessing or using thermal and mechanical energy to generate electricity or perform work. According to some embodiments, the disclosed systems use stored thermal energy to heat compressed $sCO_2$ to spin turbines for the generation of electrical energy in different configurations. In one implementation, the system uses a single pump/turbine unit for the compression and energy generation process. In another implementation, the system takes advantage of geothermal energy in connection with thermal energy stored in a thermal energy storage unit to produce a baseload power. In yet another implementation, a system utilizes a continuous or infinite supply of $sCO_2$ from a $CO_2$ pipeline to convert stored thermal energy to electrical energy. In yet another implementation, a system utilizes artificial intelligence software to optimize its electrical and thermal energy output. In yet another implementation, a propulsion system based on thermo-mechanical $CO_2$-based system is disclosed. In yet another implementation, a thermo-mechanical system is disclosed. The disclosed system uses a continuous or infinite supply of $sCO_2$ from a $CO_2$ pipeline to convert stored thermal energy and mechanical energy to electrical energy. A thermal-only system and a thermal energy storage unit are also disclosed. In one example of a thermal-only system, a compressor and a turbine are mounted on a common shaft driven by a motor generator.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and the following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
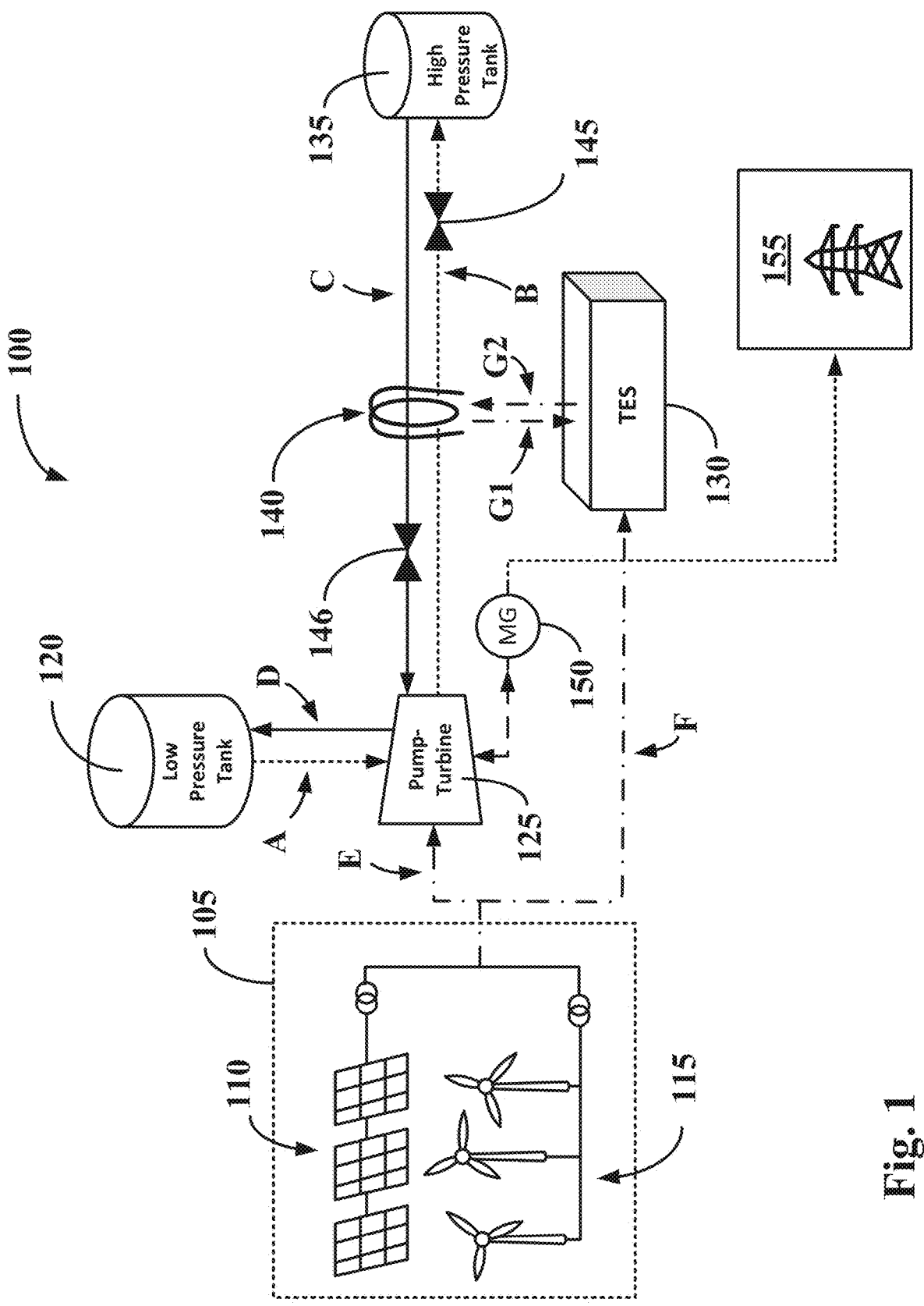
FIG. 1 is schematic diagram of a thermo-mechanical system having a single pump-turbine unit, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

Apparatus, systems, and methods are described herein that utilize $sCO_2$ for storing thermal and mechanical energy and/or harnessing or using thermal and mechanical energy to generate electricity or perform work. It will be appreciated that, for simplicity and clarity of illustration, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details.

In various examples, "thermal energy" as used herein can refer to heat. For example, the $CO_2$-based systems described herein can store energy in the form of heat (e.g., using a thermal energy storage unit), can convert the heat into electrical energy (e.g., using a generator), and/or can harness or use the heat to perform work (e.g., spin the blades of a turbine).

In various examples, "mechanical energy" as used herein can refer to pressure or a pressure difference. For example, the $CO_2$-based systems described herein can store energy in the form of pressure (e.g., pressurized $sCO_2$ in a tank), can convert the pressure into electrical energy (e.g., using a generator), and/or can harness or use the pressure to perform work (e.g., spin the blades of a turbine).

In various examples, a "thermo-mechanical system" as used herein can refer to a system that utilizes both thermal energy (e.g., heat) and mechanical energy (e.g., pressure) to generate electricity and/or perform work.

In various examples, a "thermal system" as used herein can refer to a system that utilizes thermal energy (e.g., heat) to generate electricity and/or perform work. For example, a system described herein as using only thermal energy (e.g., a "thermal-only" system) may utilize thermal energy (e.g., heat) but not mechanical energy (e.g., pressure) to generate electricity and/or perform work.

Energy generation and storage systems are described in U.S. Pat. No. 11,569,663, entitled "Integrated Carbon-Negative, Energy Generation and Storage System," issued Jan. 31, 2023, the entire contents of which are incorporated by reference.

I. Thermo-Mechanical System with a Single Pump-Turbine Unit

According to some embodiments, FIG. 1 is schematic diagram of a thermo-mechanical system 100 ("system 100") that features a single pump-turbine (PT) unit 125 connected to a motor-generator (MG) unit 150. The system 100 stores and produces electrical energy by cycling or circulating $sCO_2$ between a low-pressure $CO_2$ tank 120 and a high-pressure $CO_2$ tank 135 via PT unit 125. External to system 100 is a renewable energy grid 105 that produces energy from renewable energy sources, such as solar and wind using, for example, solar panels 110 and wind turbines 115. According to some embodiments, the renewable energy grid 105 provides energy to selective components of system 100, such as the PT unit 125 and a thermal energy storage (TES) unit 130. In some embodiments, MG unit 150 can be connected to an external power distribution grid 155. For example, operation of PT unit 125 can cause the MG unit 150 to produce electrical energy that can be supplied to the power distribution grid 155 for immediate consumption. In some embodiments, the PT unit 125 can be a compressor-turbine unit.

According to some embodiments, system 100 can be or include a closed-loop $CO_2$ system, such that $CO_2$ does not escape and does not need to be replenished in system 100 (e.g., provided there are no leaks). Further, because system 100 can obtain all its energy from renewable energy grid 105, it can be a carbon-free system that does not rely on combustion of gas, oil, coal, or other carbon-based fuels. The $CO_2$ stored in the low- and high-pressure tanks 120 and 135 (and at any point therebetween) can be kept at or above its critical point—i.e., at a pressure equal to or greater than 7.377 MPa (72.808 atm, 1,070 psi, or 73.773 bar) and at a temperature equal to or greater than 304.128 K (30.978° C. or 87.760° F.). In other words, the $CO_2$ in system 100 can be maintained in a supercritical state, such that the $CO_2$ is $sCO_2$.

During operation of system 100, according to some embodiments, thermo-mechanical energy (e.g., mechanical energy and heat) can be stored by system 100 when $sCO_2$ is pumped from the low-pressure tank 120 into the PT unit 125 where the $sCO_2$ is compressed. In FIG. 1, the flow of $sCO_2$ from the low-pressure tank 120 towards the PT unit 125 is indicated by a dashed arrow A. During the compression step, the PT unit 125, which is powered by the renewable energy grid 105 as indicated by dashed arrow line E, functions both as a pump and a compressor—e.g., the PT unit 125 pumps the $sCO_2$ from the low-pressure tank 120 and compresses it. As the $sCO_2$ is compressed inside PT unit 125, the pressure and temperature of the $sCO_2$ increase. The compressed and heated $sCO_2$ is then directed into the high-pressure tank 135, as indicated by dashed arrow B. According to some embodiments, prior to reaching the high-pressure tank 135, the $sCO_2$ can transfer a portion of its heat (e.g., 10%, 25%, 50%, or more) to a heat exchanger 140 to be stored in TES unit 130, as indicated by dashed arrow G1. This allows $sCO_2$ to be stored in the high-pressure tank 135 at a higher pressure P and a lower temperature T. A valve 145 remains open until the high-pressure tank 135 is filled.

According to some embodiments, and while the PT unit 125 is powered by the renewable energy grid 105 to compress the $sCO_2$, the PT unit 125 can cause the MG unit 150 to generate electrical energy (e.g., in the form of alternating current (AC)), which can be supplied to the power distribution grid 155 for immediate consumption. During the discharge phase, the PT unit 125 operates as a turbine and the MG unit 150 operates as a generator (e.g., generating AC power). In other words, system 100 can release a portion of the energy received by the renewable energy grid 105 to the power distribution grid 155. In alternative examples, the MG unit 150 is not used to generate electrical energy while the PT unit 125 is pumping and compressing the $sCO_2$. For example, MG unit 150 can operate as a motor (not a generator), spinning the PT unit 125 and assisting in storing energy (e.g., in the form of mechanical energy in high-pressure tank 135), instead of generating electrical energy. In some embodiments, the MG unit 150 is mechanically linked to the PT unit 125 via a single shaft. This single shaft is not shown in FIG. 1 for simplicity.

In some embodiments, TES unit 130 may store thermal energy by converting electrical energy from the renewable energy grid 105 to heat. In FIG. 1, flow of electrical energy from the renewable energy grid 105 to TES unit 130 is indicated by dashed arrow line F. A resistor, an inductor, or other electrical element(s) can be used to convert electrical energy into heat, which can be stored by TES unit 130. In other embodiments, TES unit 130 may store waste heat from one or more manufacturing facilities located in the vicinity of system 100.

In various examples, the compression process described above can be referred to as a "charging step" because the high-pressure tank 135 and/or TES unit 130 are charged with thermo-mechanical energy (e.g., pressure and heat), which is derived from renewable energy grid 105. The charging step can take place when the renewable energy grid is able to provide power, for example, during the day when the sun is shining and/or the wind is blowing. In some embodiments, the thermo-mechanical energy stored in high-pressure tank 135 and TES unit 130 is discharged during a "discharge step" that converts the stored thermo-mechanical energy back to electrical energy. The discharge step can occur when the renewable energy grid is unable to provide power, for example, during the evening hours when the sun is not shining and/or the wind is not blowing, or when energy demand on the power distribution grid 155 is high.

During the discharge step, for example, a valve 146 permits the pressurized $sCO_2$ in high-pressure tank 135 to flow back into the PT unit 125 and the low-pressure tank 120, along a path shown by solid arrows C and D, which is opposite to a path used during the charging step (e.g., shown by dashed arrows A and B). According to some embodiments, heat from the TES unit 130 can be transferred to the $sCO_2$ during the discharge step using the heat exchanger 140, as indicated by dashed arrow G2. For example, the $sCO_2$ can be heated by the TES unit 130 as the $sCO_2$ travels from the high-pressure tank 135 to the PT 125, along path C. In some implementations, the $sCO_2$ can absorb over 90% (e.g., about 92%, 96%, 98%, or 100%) of the heat it previously transferred to the TES unit 130 during the charging step. In some embodiments, when the TES unit 130 can store excess thermal energy from an external source, such as the renewable energy grid 105 and/or by means of waste heat recovery from a manufacturing facility, the $sCO_2$ may absorb over 100% (e.g., about 105%, 110%, 120%, etc.) of the heat it previously transferred to the TES unit 130 during the charging step. According to some embodiments, PT unit 125 is configured to operate as a pump/compressor during the charging step (e.g., the path of dashed arrows A and B) and as a turbine during the discharge step (e.g., the path of solid arrows C and D).

In various examples, during the discharge step, the PT unit 125 can operate as an expansion turbine that converts both mechanical energy and thermal energy (thermo-mechanical energy) stored in the $sCO_2$ (e.g., as pressure and heat) to electrical energy. For example, as the $sCO_2$ flows through the PT unit 125, the $sCO_2$ expands and releases thermo-mechanical energy that is harnessed by the PT unit 125, which is coupled to the MG unit 150 and causes the MG unit 150 to generate electricity. The electricity generated by the MG unit 150 can be released to a power distribution grid 155 for consumption. The $sCO_2$ exiting the PT unit 125 (e.g., in path D) can have a lower pressure and temperature than the $sCO_2$ entering the PT unit 125 (e.g., in path C). The $sCO_2$ exiting the PT unit 125 can be stored in the low-pressure tank 120, as indicated by solid arrow D. Valve 146 can be closed once the discharge step has been completed.

According to some embodiments, the system 100 may be charged when the renewable energy grid 105 has a surplus of energy. This surplus of energy can be stored as thermo-mechanical energy in system 100 and can be released to the power distribution grid 155 when required—e.g., when the renewable energy grid 105 has a deficit of energy, is not operable, or when there is a high energy demand from the power distribution grid 155. According to some embodiments, surplus energy from the renewable energy grid 105 may be stored as thermo-mechanical energy in system 100 (e.g., in high-pressure tank 135 and/or TES unit 130) for any length of time and may be converted to electrical energy (e.g., using MG unit 150) as needed.

The schematic diagram in FIG. 1 illustrates the principles of operation and the main components of the system 100. A person of skill in the art would appreciate that system 100 can include additional components and connections not shown in FIG. 1, without departing from the spirit and the scope of this disclosure. Further, although the charging and discharging steps are depicted as occurring on two different paths (e.g., paths A-B and C-D), a person of skill in the art would recognize that the same path (e.g., same pipes and/or plumbing fixtures) may be used during the charging and discharging steps described herein. A person of skill in the art would further recognize that system 100 may be include additional low-pressure and high-pressure tanks and/or multiple TES units (e.g., arranged as modules) to store and release additional quantities of thermo-mechanical energy. By way of example and not limitation, the high- and low-pressure tanks 135 and 120 can be stainless steel pressure vessels, and paths A-D can be made of stainless steel pipes.

Figure 2:
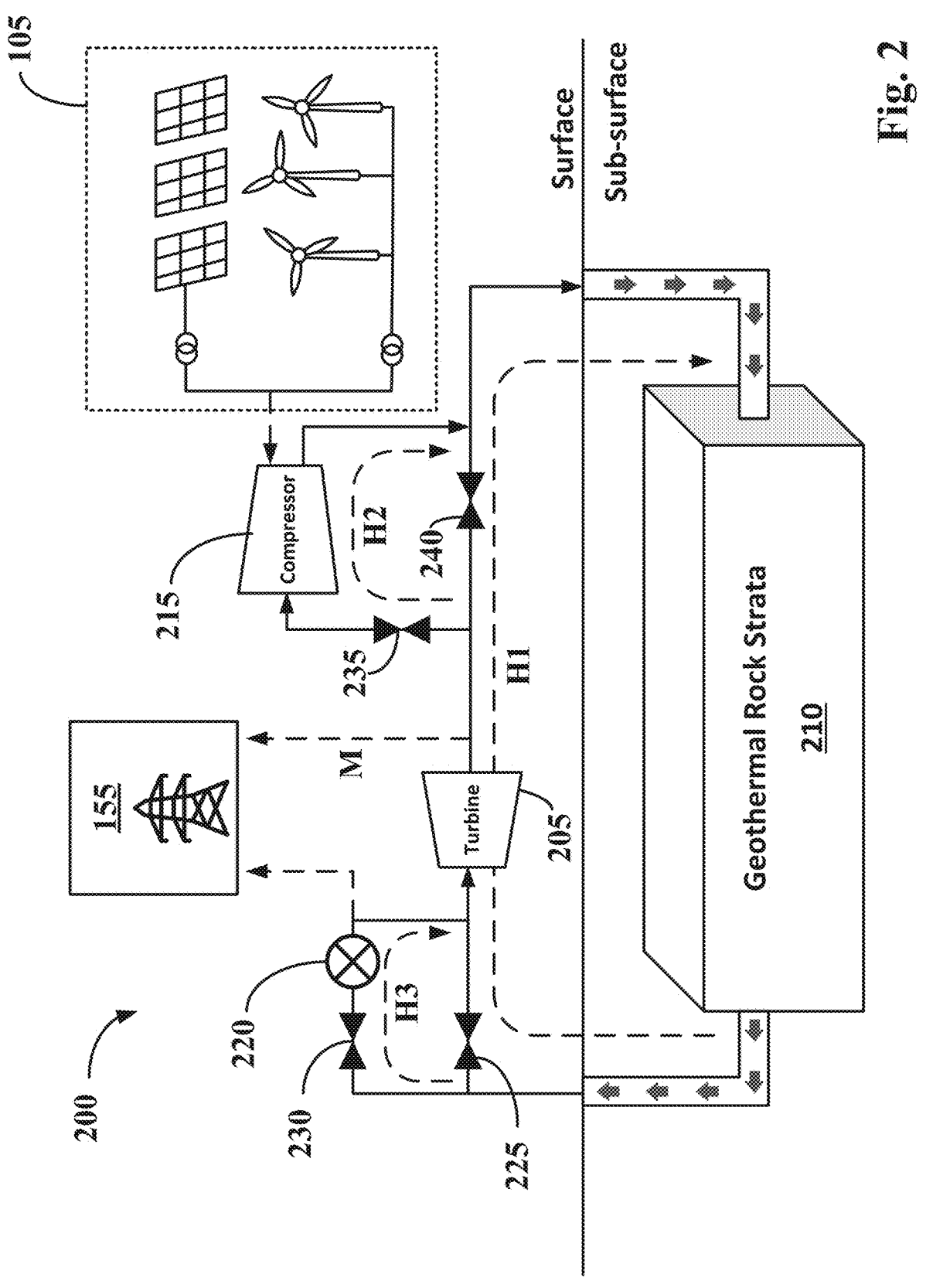
FIG. 2 is a schematic diagram of a hybrid supercritical carbon dioxide-based geothermal system, in accordance with some embodiments.

II. Hybrid sCO₂-based Geothermal System for Baseload Power Generation with Additional Energy Storage According to some embodiments, FIG. 2 is a schematic diagram of a hybrid sCO₂-based geothermal system 200 ("system 200") with energy storage and power generation capabilities. The operation of system 200 will be explained using the concepts and principles discussed above for system 100 in FIG. 1. Like system 100, the CO₂ in system 200 can be in a supercritical state at all times, such that references to CO₂ can refer to sCO₂ throughout the discussion of FIG. 2.

According to some embodiments, system 200 is or includes a closed-loop geothermal system having an underground geothermal rock strata 210. sCO₂ that flows through the geothermal rock strata 210 is heated by geothermal energy. A temperature of the sCO₂ at an exit of the geothermal rock strata 210, $T_{exit}$, is therefore higher than the temperature of the sCO₂ at an entrance of the geothermal rock strata 210, $T_{entrance}$ (e.g., $T_{exit} > T_{entrance}$, by about 100 to about 400° C.). The pressure of the sCO₂ may decrease when the sCO₂ passes through the geothermal rock strata 210. The system 200 is able to exploit the temperature differential to generate a baseload power in the MW range (e.g., of about 5 MW, 7 MW, 10 MW, etc.) based on the geothermal energy alone.

For example, referring to path H1 of FIG. 2, sCO₂ enters the geothermal rock strata 210 at an initial pressure P1 and temperature T1. The temperature of the sCO₂ increases as the sCO₂ passes through the geothermal rock strata 210 and absorbs heat in the form of geothermal energy from the strata. At the exit of the geothermal rock strata 210, the sCO₂ has a temperature T2 higher than T1 (e.g., T2>T1) and a pressure P2 lower than P1 (e.g., P2<P1). Subsequently, the heated sCO₂ continues to travel through valve 225 into expansion turbine 205 where sCO₂ expands (e.g., isentropically). Energy released during the expansion is harnessed by spinning blades of the expansion turbine 205, which can be connected to a generator (e.g., MG unit 105), for generating the baseload electrical power. The baseload power (e.g., resulting from geothermal energy) may be supplied to a power distribution grid 155 as shown by dashed arrow M. Upon exiting the expansion turbine 205, the sCO₂ is guided via path H1 back into the geothermal rock strata 210 to repeat the process. In this configuration for generating the baseload power, the system 200 can operate in a pure geothermal mode.

Additionally or alternatively, the system 200 can be configured to work in a hybrid mode where geothermal energy provides baseload power and energy stored from solar, wind, or other renewable and/or intermittent sources provides additional power when needed. In the hybrid mode, the system 200 can produce baseload power (e.g., 5 MW) at all hours of the day and can provide additional power (e.g., 5 MW) from stored solar and wind energy, e.g., on an intermittent basis.

According to some embodiments, in the hybrid mode, energy storage and energy production is provided by paths H2 and H3 shown in FIG. 2. For example, in path H2 the surplus energy from solar/wind sources in the renewable energy grid 105 is used to compress sCO₂ with a compressor 215. Accordingly, electrical energy from the renewable energy grid 105 is converted into and stored as mechanical energy in the form of pressurized sCO₂ (e.g., at a pressure of about 2000-4000 psi), which can flow through the geothermal rock strata 210. The compressed sCO₂ is then passed through an impulse turbine 220 that converts the mechanical energy into electrical energy (e.g., using a generator). According to some embodiments, the impulse turbine 220 can be physically located either upstream or downstream from expansion turbine 205. In some embodiments, the impulse turbine harnesses mechanical energy and the expansion turbine 205 harnesses thermal energy from the heated and compressed sCO₂. In hybrid mode, the system 200 can operate as a thermo-mechanical system.

In some embodiments, the impulse turbine 220 and the thermal turbine 205 can be combined into a single turbine capable of capturing both mechanical and thermal energy from the heated and pressurized sCO₂. Such modification can advantageously reduce the cost and footprint of system 200. For example, the two turbines 220 and 205 can be combined into a single thermo-mechanical turbine unit that harnesses thermal and/or mechanical energy to produce power. Suitable thermo-mechanical turbines may be available from a variety of manufacturers, such as GENERAL ELECTRIC or SIEMENS. The turbines may be customized according to desired process and operational parameters.

According to some embodiments, valves 225, 230, 235, and 240 are used to engage or disengage paths H2 and H3 from main path H1. For example, closing valves 230, 235 and opening valves 225, 240, disengages paths H2 and H3 from the main path H1 and forces the system 200 to operate in geothermal mode. Opening valves 230, 235 and closing valves 225, 240 allows system 200 to operate in hybrid mode. A person of ordinary skill in the art would recognize that the arrangement of components and valves shown in FIG. 2 is not limiting, and other arrangements, different from the one shown in FIG. 2, may be used to operate system 200 in the geothermal and hybrid modes.

In some embodiments, the expansion turbine 205 and the compressor 215 can be replaced with a PT unit, like PT unit 125 shown in FIG. 1, to reduce the cost of system 200. In such instances, system 200 can be modified so that the $sCO_2$ flows in one direction when $sCO_2$ is being heated and/or compressed (e.g., during a charging step) and in an opposite direction when $sCO_2$ is being discharged or expanded (e.g., during a discharge step). Referring again to FIG. 1, in some examples, the TES unit 130 and/or the high-pressure tank 135 in system 100 can be replaced with the geothermal rock strata 210, which can transfer heat to the $sCO_2$ and/or store high-pressure $sCO_2$.

Although system 200 has been described as a closed-loop system in which $sCO_2$ continuously circulates, it understood that $sCO_2$ losses are possible (e.g., $sCO_2$ may escape through leaks or may be sequestered into the geothermal rock strata 210). Accordingly, the $sCO_2$ in system 200 may be equipped with a mechanism (e.g., a $sCO_2$ source) that replenishes the $sCO_2$ when required.

Figure 3:
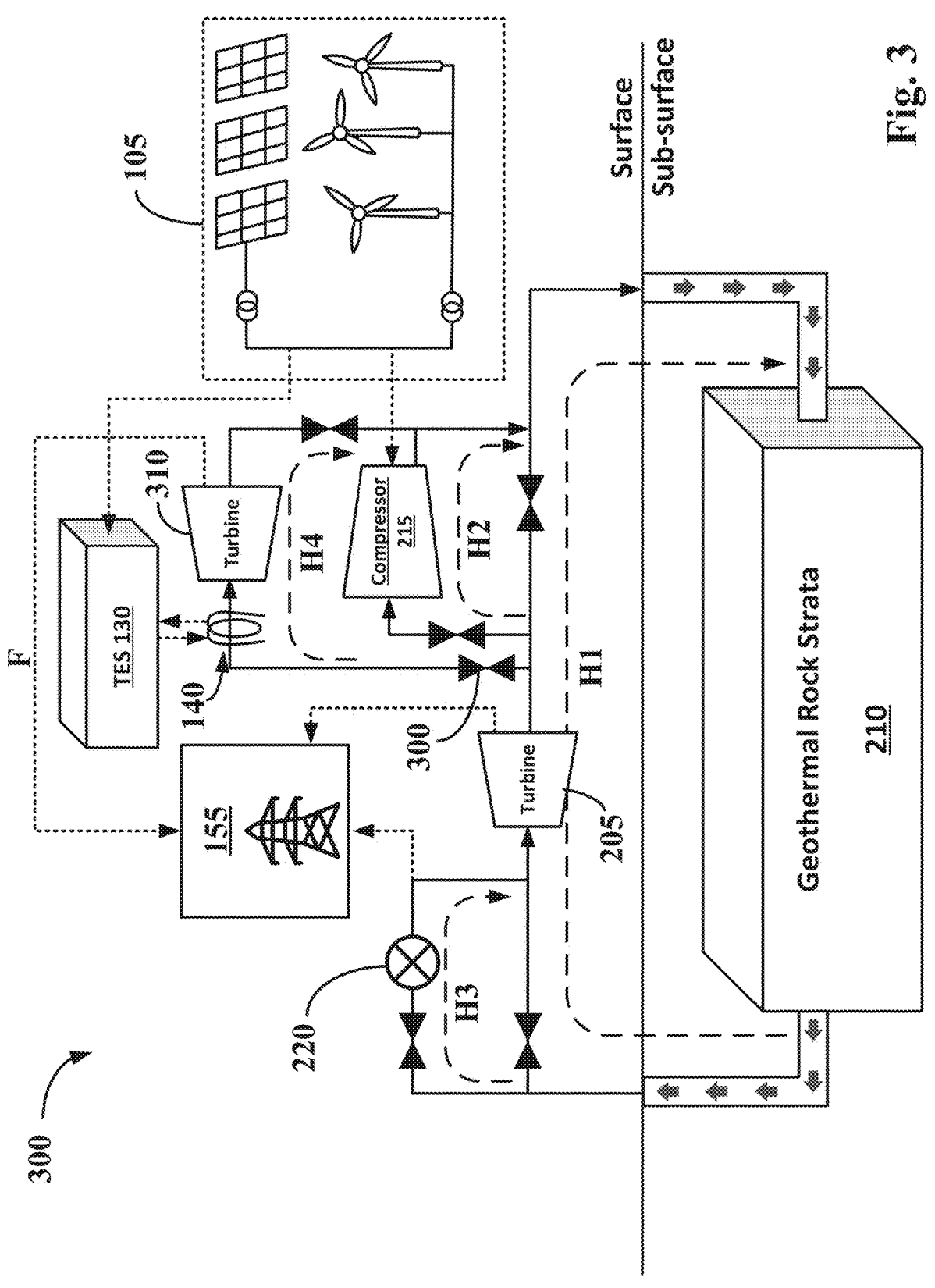
FIG. 3 is a schematic diagram of a hybrid supercritical carbon dioxide-based geothermal system having a thermal energy storage unit, in accordance with some embodiments.

III. 3-in-1 $sCO_2$-Based Hybrid System for Providing Geothermal Energy, Thermal Energy Storage, and Mechanical Energy Storage According to some embodiments, FIG. 3 is a schematic diagram of a 3-in-1 $sCO_2$-based hybrid system 300 ("system 300") that provides geothermal energy, thermal energy storage, and mechanical energy storage. System 300 is a modified version of system 200 shown in FIG. 2. The main difference between systems 200 and 300 is that system 300 includes an additional path H4, which allows system 300 to use additional modes of operation.

In some implementations, path H4 includes a TES unit 130 and a heat exchanger 140, as shown in FIG. 3. Path H4 allows system 300 to store energy from the renewable energy grid 105 in the form of thermal energy, which can be converted to electrical energy and supplied to the power distribution grid 155 when desired (e.g., when there is high demand for electrical energy or when electrical energy from the renewable energy grid 105 is not available). Like system 100, the $sCO_2$, after being diverted from turbine 205 to path H4 via a respective valve 300, is heated by heat exchanger 140 with heat previously stored in TES unit 130. The heated $sCO_2$ enters the expansion turbine 310 which converts the heat to electrical energy (e.g., via an MG unit, like the MG unit 150 shown in FIG. 1). The generated electrical energy is then supplied to the power distribution grid 155 as indicated by dashed arrow F.

According to some embodiments, impulse turbine 220, expansion turbine 205, and expansion turbine 310 can be combined into a single turbine capable of converting mechanical and thermal energy to electrical energy. Such modification can reduce the cost and size of system 300.

Figure 4:
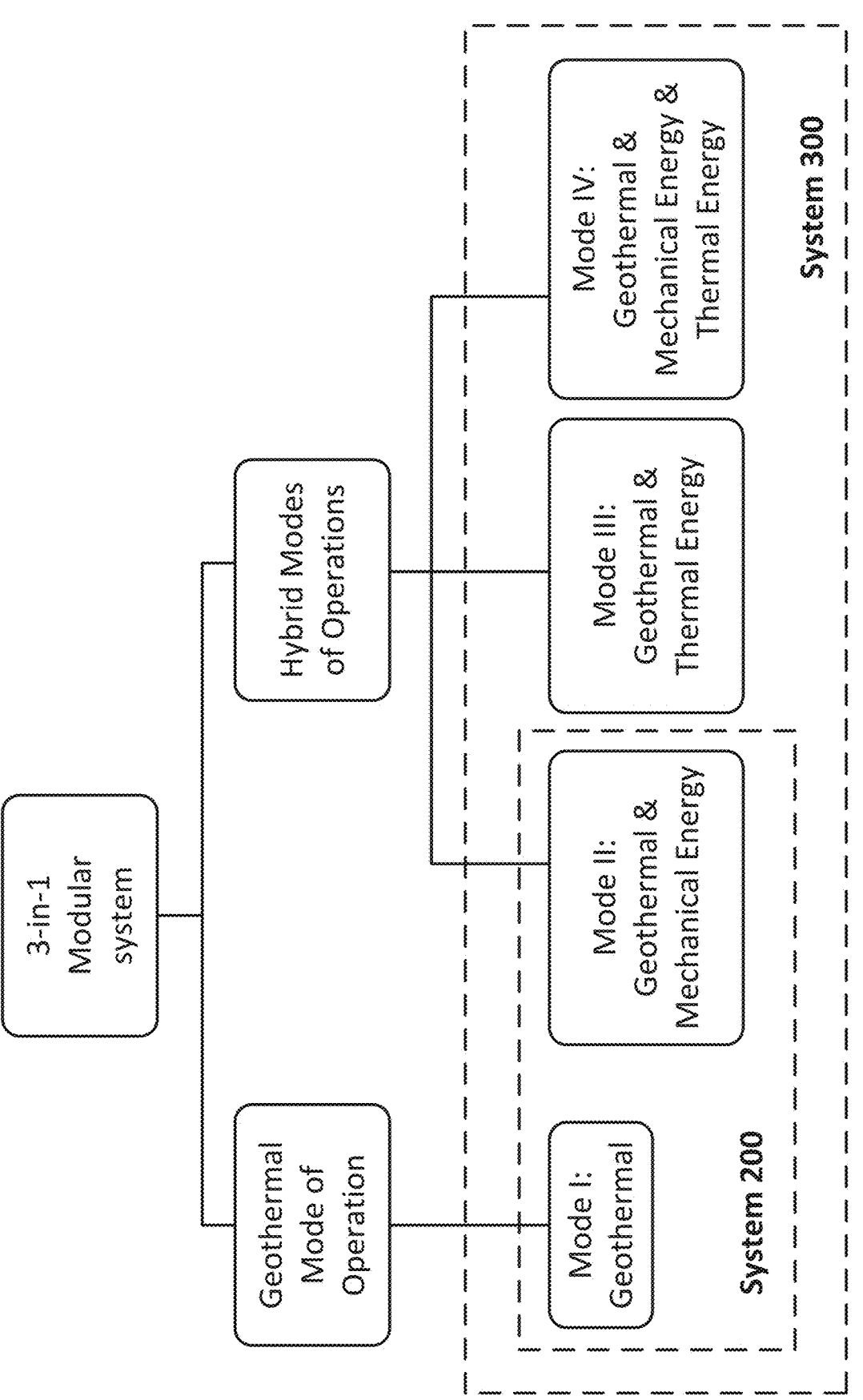
FIG. 4 is a schematic diagram illustrating operational modes of the systems shown in FIGS. 2 and 3, in accordance with some embodiments.

Referring to FIG. 4, system 300 can exhibit additional operational modes, compared to system 200. For example, as discussed above, system 200 has two main modes of operation: a geothermal mode (mode I) and a hybrid mode (mode II). By comparison, system 300 is capable of achieving additional hybrid modes of operation. For example, in a hybrid mode III, system 300 converts geothermal energy and stored thermal energy to electrical energy. Further, in a hybrid mode IV, system 300 converts geothermal energy, mechanical energy, and stored thermal energy to electrical energy.

Accordingly, system 300 can have a higher total power output than system 200. In some implementations, baseload power in the MW range (e.g., about 5 MW, 10 MW, 15 MW, etc.) is generated through system 300 when it is operated in mode I (pure geothermal). When operated in hybrid mode II, the system 300 can produce baseload geothermal power (e.g., about 5 MW, 10 MW, 15 MW, etc.) and additional power (e.g., about 5 MW, 10 MW, 15 MW, etc.) when mechanical energy is available (e.g., resulting from $sCO_2$ compressed by renewable energy). When operated in hybrid mode III, the system 300 can produce baseload geothermal power (e.g., about 5 MW, 10 MW, 15 MW, etc.) and additional power (e.g., about 5 MW, 10 MW, 15 MW, etc.) from stored thermal energy. When operated in hybrid mode IV, the system 300 can produce baseload geothermal power (e.g., about 5 MW, 10 MW, 15 MW, etc.), power from stored mechanical energy (e.g., about 5 MW, 10 MW, 15 MW, etc.), and power from stored thermal energy (e.g., about 5 MW, 10 MW, 15 MW, etc.).

IV. Thermo-Mechanical Energy Storage Using $CO_2$

Figure 5:
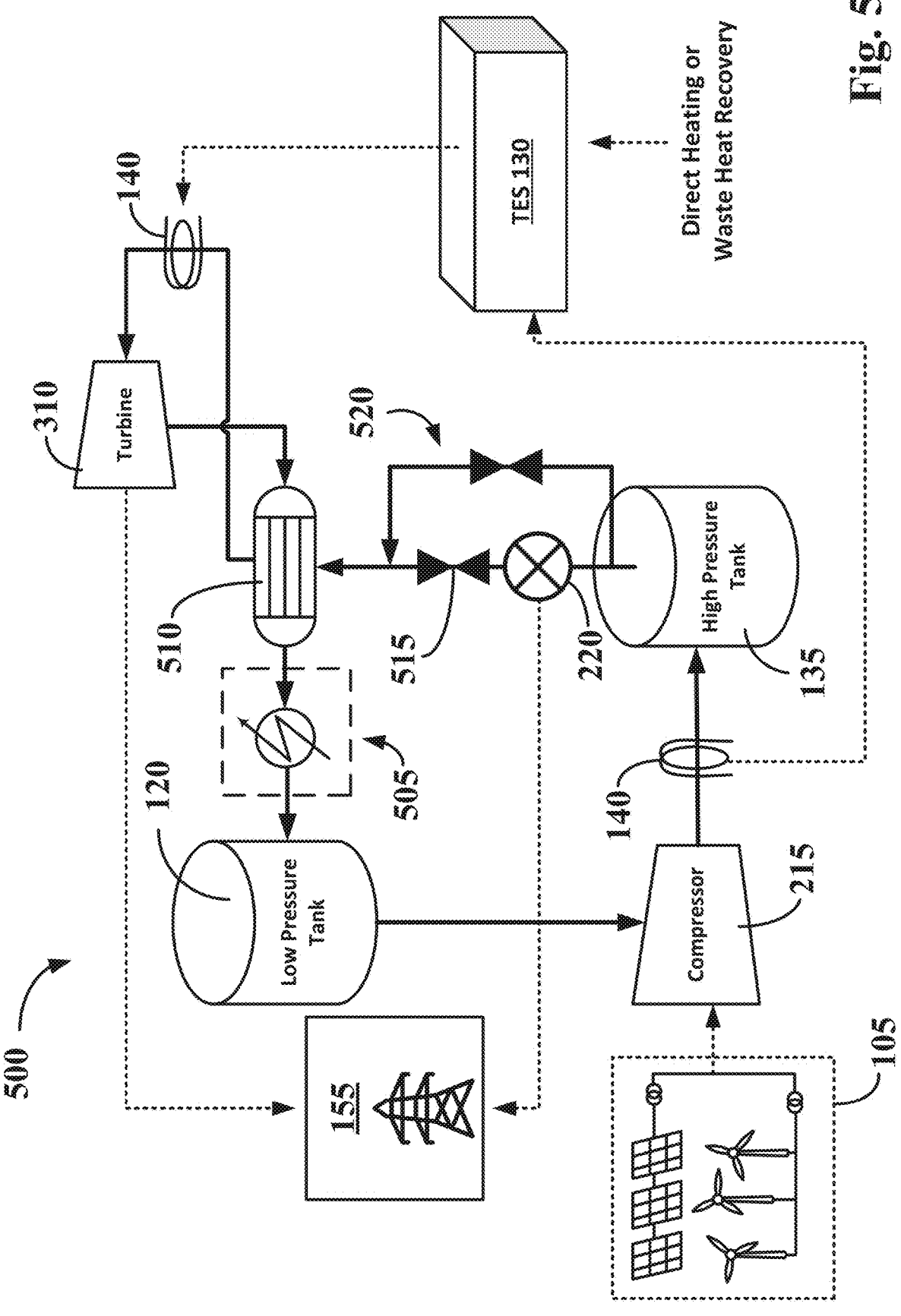
FIG. 5 is a schematic diagram of a thermo-mechanical energy storage system that uses carbon dioxide as the storage and energy producing medium, in accordance with some embodiments.

According to some embodiments, FIG. 5 is a schematic diagram of a thermo-mechanical energy storage system 500 ("system 500") that uses $CO_2$ as the storage and energy producing medium. In some implementations, the $CO_2$ stored in system 500 may not always be in the supercritical state as will be discussed below.

According to some embodiments, when there is a surplus of electricity produced by solar and wind farms (e.g., from a renewable energy grid 105), system 500 initiates a charging cycle where a single-stage or multi-stage compressor or pump 215 is used to compress and convert the $CO_2$ (e.g., from a low-pressure tank 120) to a supercritical state or high-density liquid phase. Heat is also generated during the compression process, such that a temperature and pressure of the $CO_2$ can increase. A portion of the heat can be separated from the compressed $sCO_2$ (e.g., using heat exchanger 140) and can be stored in a TES unit (e.g., TES unit 130). High-pressure $CO_2$ (e.g., in a supercritical state or a liquid state) can be stored in high-pressure tank 135. The TES unit 130 can be charged with additional thermal energy derived from a variety of sources, such as, for example, renewable sources (e.g., from renewable energy grid 105), industrial waste, geothermal heat, etc. In some embodiments, the TES unit 130 may be agnostic to the sources of thermal energy. Although system 500 is shown with a single TES unit 130 for simplicity, it is to be understood that multiple TES units 130 (e.g., 2, 3, 5, 10, etc.) may be used for thermal energy storage in system 500.

At the start of the discharge cycle, electricity can be produced running the pressurized $CO_2$ through a sequence of turbines, such as impulse turbine 220 and turbine 310. For example, the impulse turbine 220 can be used to convert mechanical energy to electricity, and the turbine 310 can be used to convert thermal energy to electricity. The electricity produced by the impulse turbine 220 and the turbine 310 can be provided to a power distribution grid 155, as described herein. Accordingly, system 500 can operate as a hybrid system that utilizes both mechanical energy and thermal energy stored in the $CO_2$ (e.g., as pressure and heat, respectively). In the depicted example, TES unit 130 can transfer heat to the $CO_2$ using heat exchanger 140, before the $CO_2$ enters the turbine 310. According to some embodiments, system 500 utilizes $CO_2$ as a working fluid in a Brayton thermodynamic cycle (power cycle fluid) to convert mechanical energy and thermal energy to electricity. For example, the heated and/or compressed $CO_2$ can expand through a turbine and cause the turbine blades to spin, thereby performing work to generate electricity. The turbine 220 and 310 can be a single unit.

According to some embodiments, system 500 may also feature a recuperator 510, which can absorb residual heat from the $CO_2$ as it exits turbine 310 and pre-heat the $CO_2$ exiting the impulse turbine 220, before it enters turbine 310. In further embodiments, an optional cooling circuit 505 may be used to cool down the $CO_2$ prior to being stored in low-pressure tank 120.

In some examples, some or all of the $CO_2$ exiting the high-pressure tank 135 can bypass the impulse turbine 220 and be delivered directly to the turbine 310 (e.g., after passing through the recuperator 510). The turbine 310 in such instances can harness both the mechanical energy and the thermal energy stored in the $CO_2$. A bypass line 520 can direct the $CO_2$ around the impulse turbine 220 and a back pressure regulator or valve 515, as shown in FIG. 5.

V. $CO_2$ Pipeline as Energy Storage Asset for Long Duration Energy Storage

Figure 6:
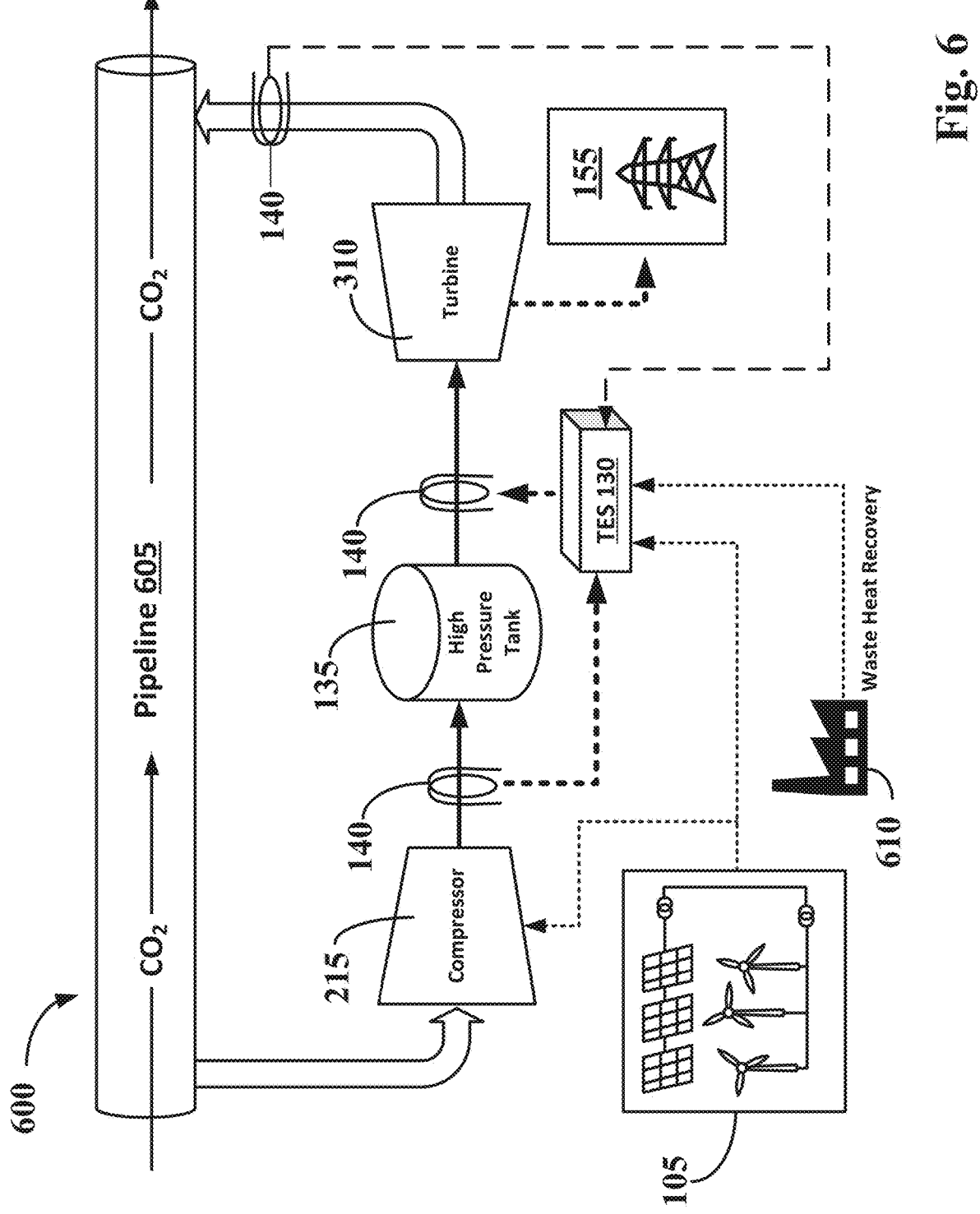
FIG. 6 is a schematic diagram of a system that utilizes a carbon dioxide pipeline as an energy storage asset for long duration energy storage, in accordance with some embodiments.

According to some embodiments, FIG. 6 is a schematic diagram of a system 600 that utilizes a $CO_2$ pipeline 605 as an energy storage asset for long duration energy storage. According to some embodiments, the pipeline 605 can serve as a low-pressure $CO_2$ tank. By way of example and not limitation, the $CO_2$ flows continuously within pipeline 605 as shown by the directional arrows in FIG. 6.

A $CO_2$ pipeline, like $CO_2$ pipeline 605, can be a dedicated pipeline system designed to transport $CO_2$ from one location to another. The pipeline can be used for various purposes, including capturing and transporting $CO_2$ emissions from industrial facilities (such as power plants, cement factories, refineries, steel mills, petrochemical facilities, and biogas facilities) to storage sites, where the $CO_2$ can be sequestered underground to mitigate or avoid greenhouse gas emissions. $CO_2$ pipelines are also used for enhanced oil recovery (EOR) projects, where $CO_2$ is injected into oil reservoirs to enhance oil production. Because $sCO_2$ exhibits a substantially higher density compared to gaseous $CO_2$, it can be transported in larger amounts within the pipeline, which reduces the reliance on high-pressure systems and makes long-distance transport of $CO_2$ more efficient. Further, $sCO_2$ can reduce compression energy requirements compared to compressed $CO_2$ gas, which can result in energy savings during transportation.

Despite its advantages, however, handling $sCO_2$ in pipelines can present challenges due to its high-density and unique properties. These challenges include issues related to material compatibility, corrosion, and pressure management, which require careful engineering and design considerations.

By way of example and not limitation, the $CO_2$ pipeline 605 can have a length of about 218 miles, a diameter of about 20 inches, and an estimated flow capacity of about 380 million standard cubic feet per day (MMcfd). The $CO_2$ within the $CO_2$ pipeline 605 can be in a supercritical state at a temperature of about 33° C. and a pressure of about 1200 psi, and can have a volumetric density of about 650.7 $kg/m^3$. References to $CO_2$ in the following discussion of FIG. 6 correspond to $sCO_2$, unless otherwise indicated.

The operation of system 600 includes diverting a portion of the $sCO_2$ flow into a compressor 215 where the $sCO_2$ is compressed and stored in high-pressure tank 135. As discussed herein, heat can be generated when $sCO_2$ is compressed and this excess heat can be recovered from the $sCO_2$ (e.g., using a heat exchanger 140) and stored in the form of thermal energy in a TES unit 130. Although system 600 is depicted with a single TES unit 130, additional TES units 130 may be used to increase the thermal energy storage capacity of system 600. Accordingly, a system 600 with multiple TES units 130 is within the spirit and the scope of this disclosure. According to some embodiments, removing heat from the compressed $sCO_2$ is desirable because it can allow larger quantities of $sCO_2$ to be stored in the high-pressure tank 135. The heat can be transferred back to the $sCO_2$ when the $sCO_2$ is being released from the high-pressure tank. In some embodiments, the compressor 215 is powered by solar and wind assets, such as the renewable energy grid 105, or other sources. Similarly, the TES unit(s) 130 may increase its thermal energy storage by recovering waste heat from manufacturing facilities 610 or by accumulating thermal energy produced using the renewable energy grid 105. Mechanical and thermal energy may be stored in the high-pressure tank 135 and TES unit(s) 130, respectively, for as long as needed and/or until system 600 is used to convert the stored energy back to electrical energy. In various examples, the conversion can occur when electrical energy in the power distribution grid 155 is in high demand or when additional electrical energy needs to be produced.

To convert the stored energy back to electrical energy, $sCO_2$ can be released from the high-pressure tank 135 and/or heated by TES unit 130 via the heat exchanger 140 before it is guided into turbine 310. As discussed in previous systems, turbine 310 may be configured to convert both the mechanical and thermal energy stored in the $sCO_2$ to electrical energy, which is then supplied to the power distribution grid 155 in the form of electricity. Upon exiting the turbine 310, the $sCO_2$ has a lower temperature and pressure and is guided back to the pipeline 605. In some embodiments, residual heat from the exhausted $sCO_2$ may by recovered by the TES unit 130 via another heat exchanger 140 located between the turbine 310 and the pipeline 605 as shown in FIG. 6. Advantageously, system 600 can leverage existing infrastructure (e.g., the $sCO_2$ pipeline 605) and/or use the pipeline 605 as a long-duration energy storage asset (e.g., a low-pressure tank), without interrupting or impacting other operations associated with the pipeline 605.

In some implementations the compressor 215 and turbine 310 may be mechanically linked with one another via a single or common shaft. In other implementations, each of the compressor 215 and turbine 310 may be mechanically linked to different shafts and/or coupled using other linkage devices (e.g., one or more gears, belts, chains, or the like).

Figure 7:
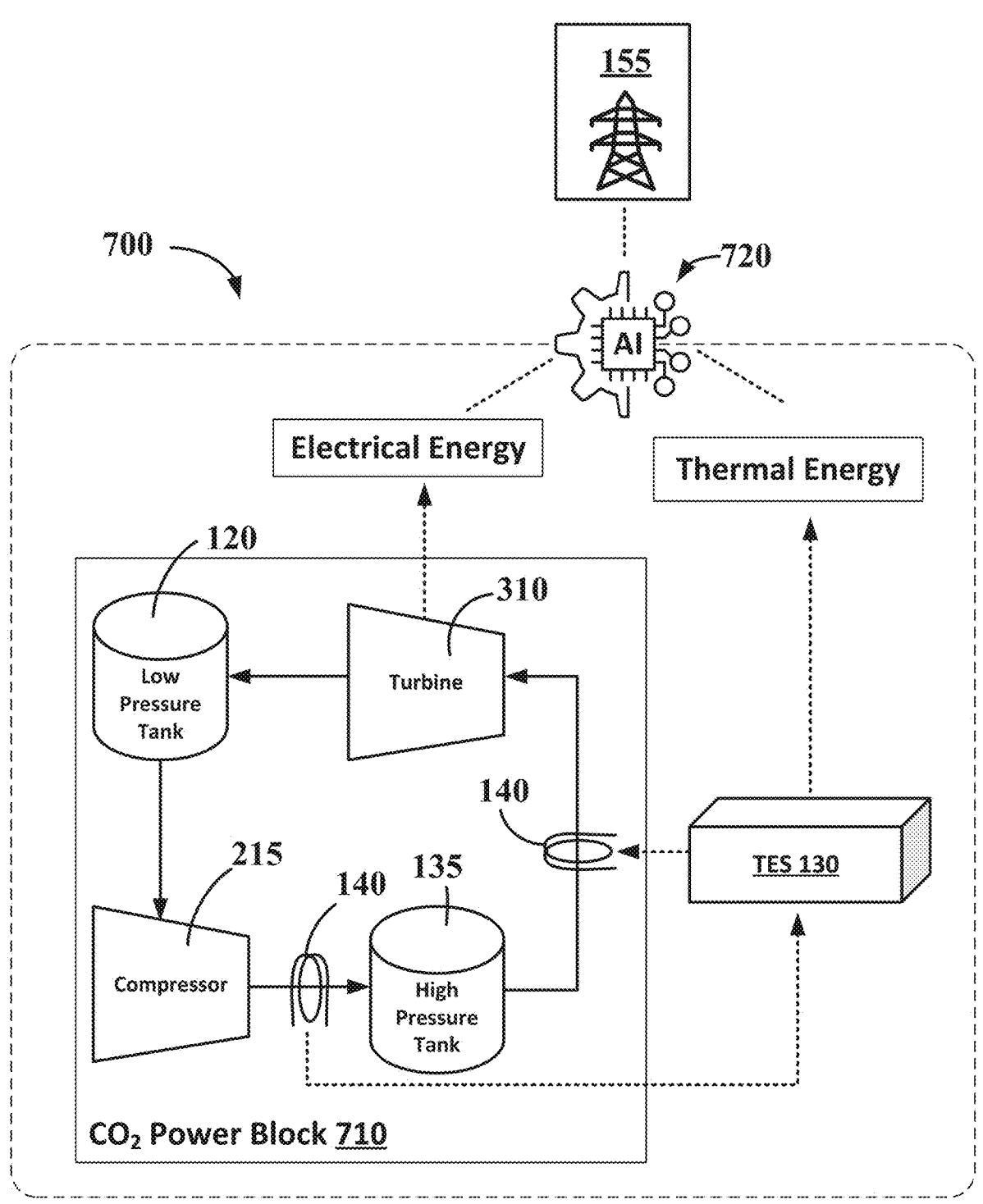
FIG. 7 is a schematic diagram of an exemplary system that describes a plug-and-play, supercritical carbon dioxide-based thermo-electric module for industrial applications, in accordance with some embodiments.

VI. Artificial Intelligence Controlled $CO_2$-Based Thermo-Electric Module for Industrial Applications According to some embodiments, FIG. 7 is a schematic diagram of an exemplary system 700 that illustrates a plug-and-play, $CO_2$-based thermo-electric module for industrial applications. System 700, which may supply electrical and thermal energy on demand, includes a TES unit 130, a $CO_2$ power block 710, and an artificial intelligence (AI) system 720.

The TES hardware (e.g., one or more TES units 130) is a low-cost, field installable, plug-and-play, modular unit for process heating as well as waste heat recovery. In some embodiments, the TES hardware can have connection points interoperable with existing industrial fittings to facilitate easier integration. By way of example and not limitation, the TES hardware may store heat from industrial waste heat recovery (not shown) or concentrated solar or wind energy plants (e.g., from renewable energy grid 105, not shown).

The $CO_2$ power block 710 can be a $sCO_2$ Brayton cycle-based heat-to-power conversion module with turbines for low to medium-temperature heat applications (e.g., ranging from about 200° C. to about 500° C.). By way of example and not limitation, $CO_2$ power block 710 can operate like the system 600 shown in FIG. 6 with the exception that the pipeline 605 in system 600 is replaced with a low-pressure tank 120. In other examples, the high-pressure tank 135 in FIG. 7 or in any embodiment described herein can be replaced with a pipeline (e.g., containing compressed $sCO_2$).

According to some embodiments, the AI system 720 can be trained to accurately predict the charging and discharging cycles of the $CO_2$ power block 710 and of the TES hardware for optimal performance. For example, the AI system 720 may predict the setpoints for charging and discharging the $CO_2$ power block 710 to capitalize on low electricity prices, periods of low industrial activity, weather variations, availability of renewable energy resources, and the like. Further, the AI system 720 may automatically toggle between electrical and thermal energy supply depending on the demand and other considerations. By way of example and not limitation, the AI system 720 may perform a time series analysis on historical data consisting of weather data, energy cost data, thermal to electrical energy usage by the industrial facility, and the like.

The AI system 720 can include at least one processor that is programmed to perform a variety of operations for training and executing one or more predictive models, such as machine learning (ML) models, neural network models, and the like. The AI system 720 can be trained to predict optimal times or instances when the $CO_2$ power block 710 should be charged and/or discharged. The AI system 720 can be used to monitor and/or control the system 700. For example, the AI system 720 can be or include a controller (or can be in communication with a controller) that can operate one or more components of the system 700, for example, according to predictions made by the AI system 720.

Figure 8:
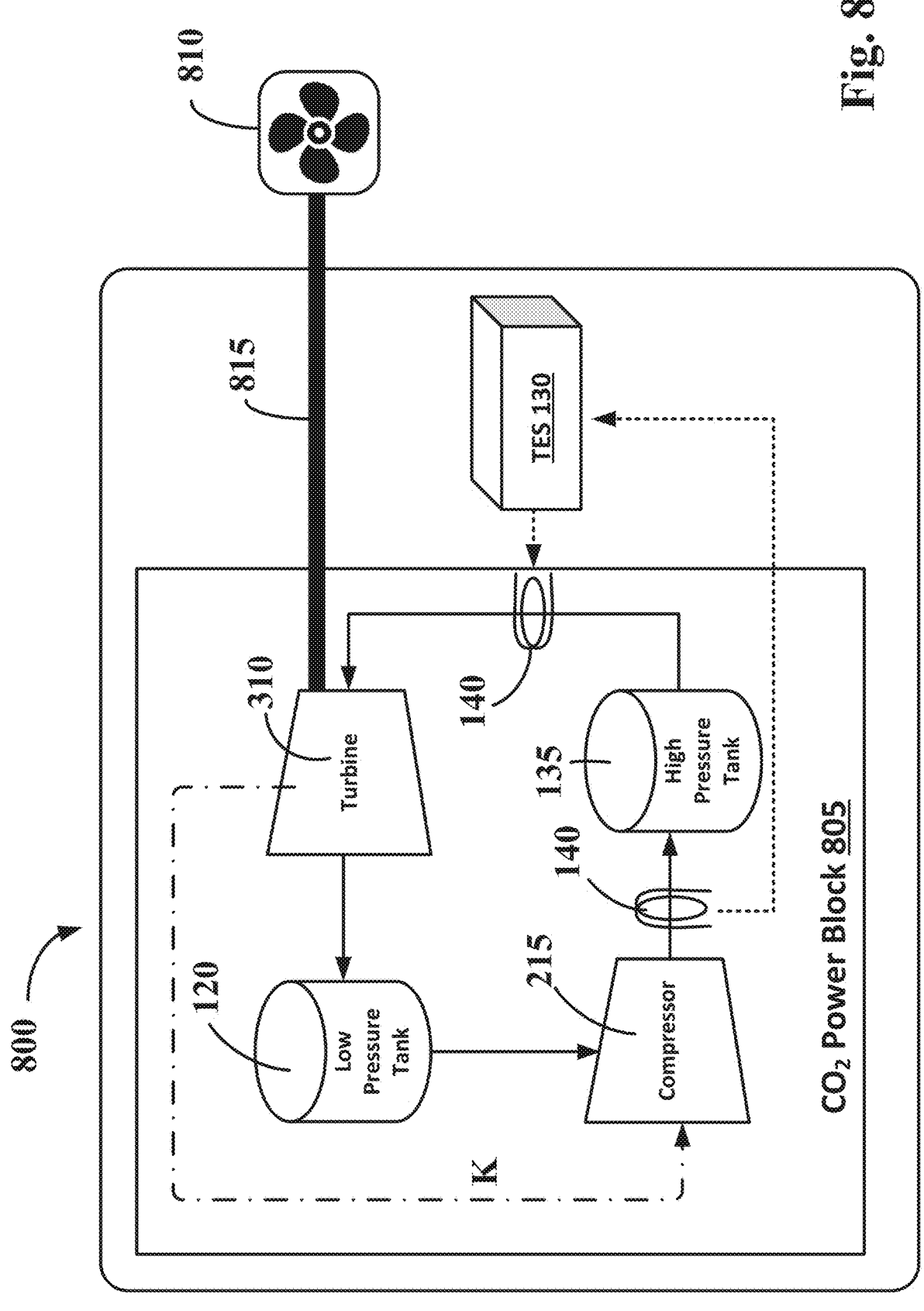
FIG. 8 is a schematic diagram of a supercritical carbon dioxide-based propulsion system with thermal energy storage, in accordance with some embodiments.

VII. Propulsion System Featuring Thermal Energy Storage with $sCO_2$ Turbine According to some embodiments, FIG. 8 is a schematic diagram of a propulsion system 800 ("system 800") that features a TES unit 130 and a $CO_2$ power block 805. The TES unit 130 stores heat that can be used to heat the $CO_2$ in power block 805 prior to being driven into turbine 310. As discussed above, the heated/compressed $sCO_2$ expands within turbine 310 and performs work by spinning the blades of turbine 310.

In the implementation of system 800, the spinning blades of turbine 310 may be connected to an MG unit (e.g., MG unit 150, not shown) for generating electrical energy. At the same time, the spinning blades of turbine 310 can be connected (e.g., via one or more gears, couplings, sprockets, chains, or other mechanical linkages) to a shaft 815 of a propeller wheel 810 for transferring the mechanical energy to the propeller wheel 810. Consequently, spinning the turbine 310 can produce electrical energy and/or mechanical energy, which can be transferred to the shaft 815 of the propeller wheel 810 (or other drive component) to produce torque and/or thrust.

In some embodiments, electrical energy produced by the turbine 310 can be used to power the compressor 215 of the $CO_2$ power block 805 as indicated by dashed arrow K in FIG. 8. According to some embodiments, the amount of electrical power produced by turbine 310 can be greater than that consumed by compressor 215. Surplus electrical power can be stored in TES unit 130, if desired. In some embodiments, compressor 215 may be at least partially powered by a battery pack, a fossil fuel generator, or other power source, for example, when the turbine is 310 is unable to provide sufficient power.

In some embodiments, system 800 can be used to replace or supplement fossil fuel-driven propulsion for air and marine applications. For instance, a ship may store thermal energy in one or more TES units 130 and convert the stored thermal energy to mechanical work via respective $CO_2$ power blocks 805. In other words, multiple TES units 130 with respective $CO_2$ power blocks 805 may be used to drive one or more propeller wheels, like propeller wheel 810, within an aircraft, ship, train, or other vessel or vehicle.

VIII. $CO_2$ Pipeline Retrofit with a Power Block to Generate and Store Energy As discussed above for system 600 in FIG. 6, $CO_2$ pipelines can be located near industrial sites where large quantities of $CO_2$ are produced as a byproduct of various industrial processes. These industrial processes can also produce heat, which is often wasted by being released into the environment. Advantageously, the systems and methods described herein can harness the waste heat using one or more TES units and $sCO_2$ from the pipeline to run a power cycle (e.g., a Brayton Cycle) and produce electricity. In this scenario, a compressor and an expander can be mounted on a common shaft along with a motor generator. A heat exchanger can be used to transfer heat from the TES unit(s) to the $sCO_2$. A recuperator can be used to transfer heat from high-temperature $sCO_2$ to low-temperature $sCO_2$.

Figure 9:
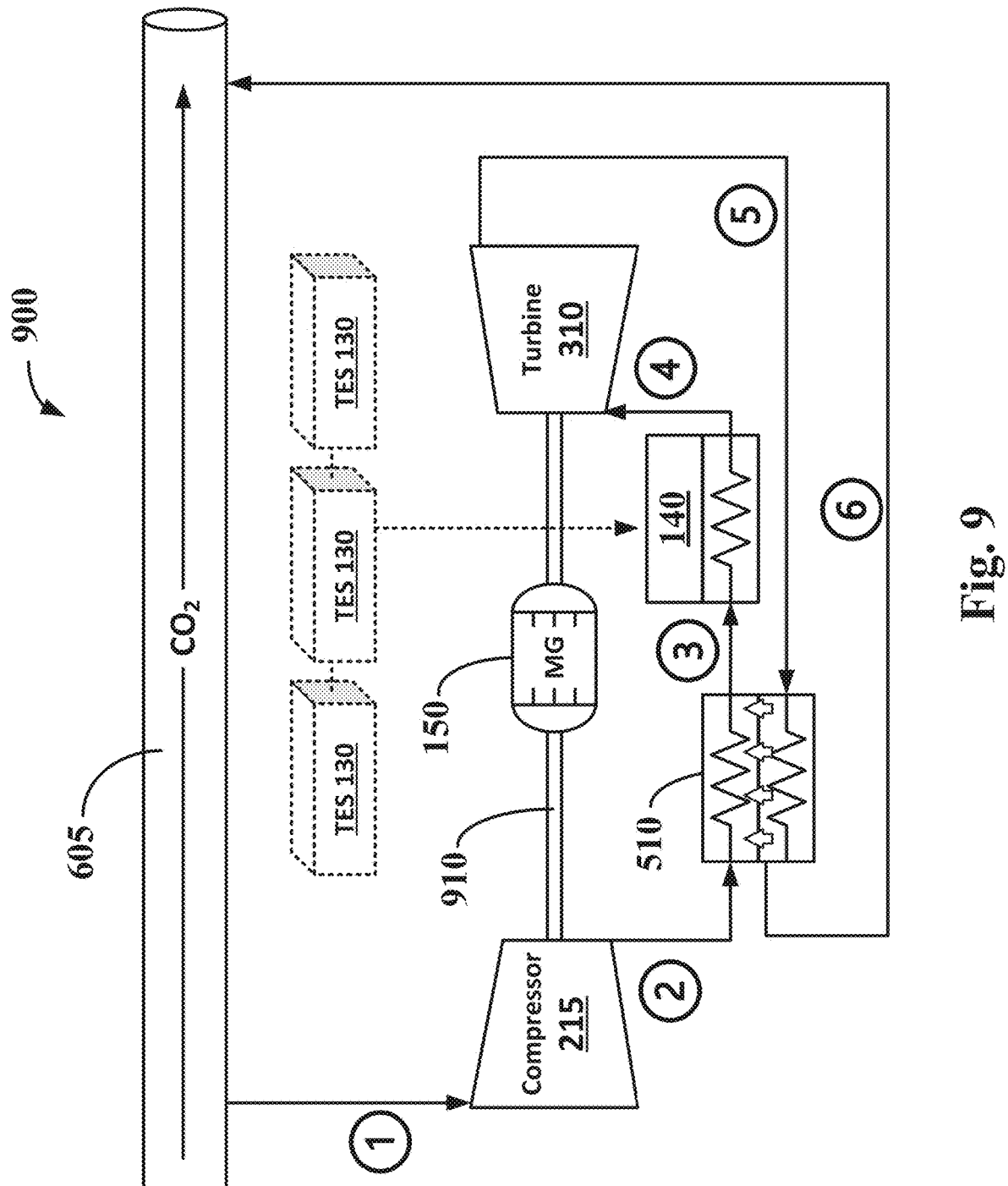
FIG. 9 is a schematic diagram of a system having a carbon dioxide pipeline and a power block for energy generation and storage, in accordance with some embodiments.

For example, FIG. 9 is a schematic diagram of a system 900 that features the components of the system described above. System 900 includes an $sCO_2$ pipeline 605 (e.g., the same pipeline used in FIG. 6 for system 600), a compressor 215, and turbine 310 (alternatively referred to as an expander), with the compressor 215 and the turbine 310 mounted on a common shaft 910 with an MG 150. System 900 further includes a heat exchanger 140 and a recuperator 510. Heat exchanger 140 can be connected to one or more TES units 130 and can be used to transfer heat from the one or more TES units 130 to the $sCO_2$. For example, when excess energy from a renewable grid (e.g., renewable energy grid 105, not shown) and/or waste heat is available, the energy can be stored as heat in the one or more TES units 130 connected to heat exchanger 140.

The operation of system 900 is described next with reference to paths 1-6 shown in FIG. 9. In path 1, a portion of the $sCO_2$ is diverted from pipeline 605 towards compressor 215 where the $sCO_2$ is compressed. In path 2, the pressurized $sCO_2$ is pre-heated by passing through recuperator 510. In some embodiments, recuperator 510 pre-heats the $sCO_2$ by capturing residual heat from the $sCO_2$ exhausted by turbine 310 at path 5. In path 3, the $sCO_2$ is heated via heat exchanger 140 from the thermal energy stored in the one or more TES units 130 coupled to the heat exchanger 140. In path 4, the hot, pressurized $sCO_2$ is expanded across turbine 310, which exhausts $sCO_2$ having a lower pressure and temperature than in path 4. The exhausted $sCO_2$, however, may still carry residual heat that can be captured by the recuperator 510, as discussed above. In path 6, the exhausted $sCO_2$ exits the recuperator 510 and returns back to the $CO_2$ pipeline 605.

In various examples, the compressor 215 and the turbine 310 of system 900 can be locked together or rotationally fixed with the MG 150 via the common shaft 910, such that MG 150 can produce electrical energy when the compressor 215 and the turbine 310 are spinning. During startup of the system 900, the compressor 215 may be at least partially powered by an external source, such as the renewable energy grid 105 (not shown), a battery pack (not shown), or fossil fuel generator (not shown). When system 900 reaches a steady state, however, mechanical energy output by turbine 310 can be more than sufficient to operate the compressor 215 and produce electrical energy via MG 150. Under such conditions, compressor 215 can be disconnected from its external power source and sufficient power for the system 900 can be obtained by converting heat from the one or more TES units 130 to electrical energy.

A person of ordinary skill in the art would understand that the shaft 910 may be connected to the compressor 215 and/or the turbine 310 using one or more couplings, gears, sprockets, chains, or other linkages (not shown) that allow the compressor 215 and the turbine to rotate at different angular velocities, if desired. Such linkages can be configured to disengage (e.g., using a clutch), for example, in the event of a malfunction.

Modifications of system 900 are possible and within the spirit and the scope of this disclosure. For example, in system 900, the compressor 215 and turbine 310 may be combined into a single PT unit, such as PT unit 125 shown in FIG. 1. In this configuration, for example, MG 150 can be connected via shaft 910 to the PT unit, and the PT unit can operate as a compressor when the sCO$_2$ flows in one direction, and operate as a turbine when the sCO$_2$ flows in the opposite direction, as described for system 100 in FIG. 1.

Figure 10:
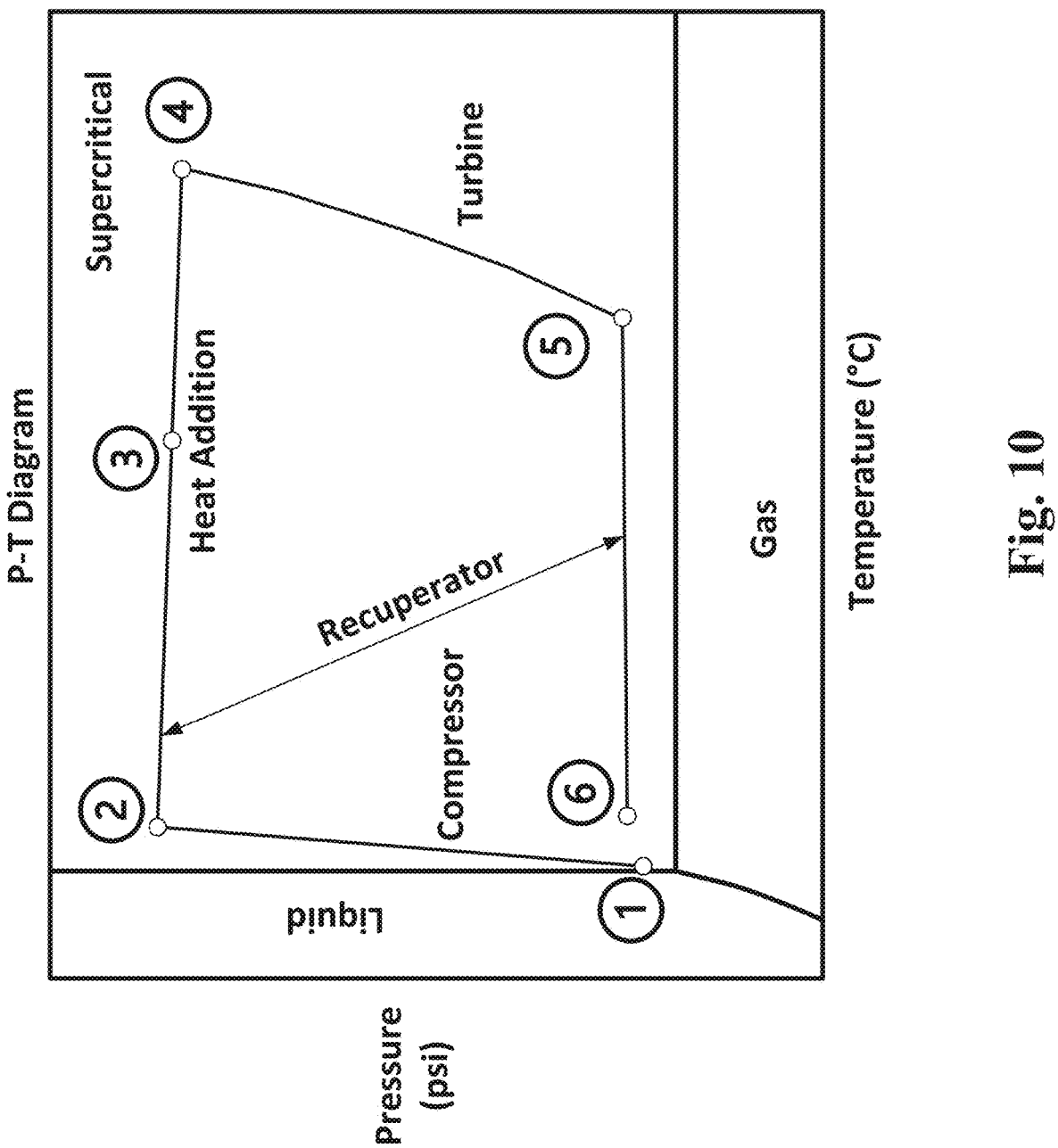
FIG. 10 is a carbon dioxide Pressure-Temperature diagram for the system of FIG. 9, in accordance with some embodiments.

According to some embodiments, FIG. 10 is a Pressure-Temperature (P-T) diagram of the sCO$_2$ for paths 1-6 described above. Table 1 below illustrates exemplary CO$_2$ temperature and pressure ranges for paths 1 through 6 in the system 900. Various embodiments include any parameter value (e.g., integer or decimal value) within the cited ranges, and each of these parameter values can represent an endpoint of a range. For instance, between paths 1-2, the sCO$_2$ is compressed to a pressure, for example, greater than, less than, and/or equal to 2980, 2981, 2982, . . . , 3478, 3479, or 3480 psi. Between paths 2-3, the sCO$_2$ is preheated by the recuperator 510 to a temperature, for example, greater than, less than, and/or equal to 285, 286, 287, . . . , 350, 351, or 352° C. Between paths 3-4, the sCO$_2$ is heated by heat exchanger 140 to a temperature, for example, greater than, less than, and/or equal to 465, 466, 467, . . . , 523, 524, or 525° C. Between paths 4-5, the sCO$_2$ passes through the turbine 310 and experiences a drop in pressure and temperature, for example, the sCO$_2$ reaches a pressure greater than, less than, and/or equal to 1180, 1181, 1182, . . . , 1450, 1451, or 1453 psi and a temperature greater than, less than, and/or equal to 380, 381, 382, . . . , 425, 426, or 427° C. Between paths 5-6, the sCO$_2$ passes through recuperator 510 for a second time to release residual heat and reach a temperature, for example, greater than, less than, and/or equal to 40, 41, 42, . . . , 70, 71, or 72° C. The cycle may by repeated any number of times because CO$_2$ pipeline 605 can provide a continuous supply of sCO$_2$. Express support and written description of the temperature and pressure ranges (in addition to the ones provided above) for paths 1 through 6 are hereby represented below.

TABLE 1

| | Exemplary pressure and temperature ranges for paths 1 through 6. | | | |
|---|---|---|---|---|
| | Temperature (° C.) | | Pressure (psi) | |
| Path | Min | Max | Min | Max |
| 1 | 19 | 69 | 920 | 1420 |
| 2 | 50 | 90 | 2980 | 3480 |
| 3 | 285 | 352 | 2960 | 3460 |
| 4 | 465 | 525 | 2940 | 3440 |
| 5 | 380 | 427 | 1180 | 1453 |
| 6 | 40 | 72 | 1120 | 1410 |

In some embodiments, a portion of the sCO$_2$ in the pipeline 605 may be diverted and used by the system 900. Alternatively or additionally, the entire flow of sCO$_2$ in the pipeline 605 may be diverted through system 900. In general, the power produced by the system 900 can be higher when the flowrate of sCO$_2$ through the turbine 310 is higher.

IX. Thermo-Mechanical Systems

According to some embodiments, thermo-mechanical energy storage based on sCO$_2$ can be provided in a closed-loop configuration that enables flexible, on-demand heat and electricity discharge via a low-cost and small footprint system. Such a system is shown schematically in FIG. 11 as system 1100. In some embodiments, system 1100 is suitable for short and long-duration thermo-mechanical energy storage. By way of example and not limitation, system 1100 includes an energy storage system (ESS) in the form of TES units 130 (for storing thermal energy) and sCO$_2$ tanks 120 and 135 (for storing mechanical energy). A compressor 215 and turbine 310 form an energy conversion plant (ECP) for producing electrical energy and/or work. In some embodiments, turbine 150 is connected to an MG unit 150, which may be further electrically coupled to a power distribution grid, such as the power distribution grid 155 shown in FIG. 11. In some embodiments, the compressor 215 can be powered by an external energy source, such as a renewable energy source (not shown), excess grid electricity, etc.

The energy in system 1100 can be stored in the form of heat in one or more TES units 130 (e.g., with each using a suitable storage medium) and in the form of mechanical energy as pressurized high-density sCO$_2$. A charging path (covering sub-sections C1 through C7) and a discharging path (covering sub-sections D1 through D7) of system 1100 produce a thermodynamic cycle that transforms the stored energy into electricity and/or work. According to some embodiments, the thermodynamic cycle produced by system 1100 is shown in the P-T diagram of FIG. 12.

Figure 11:
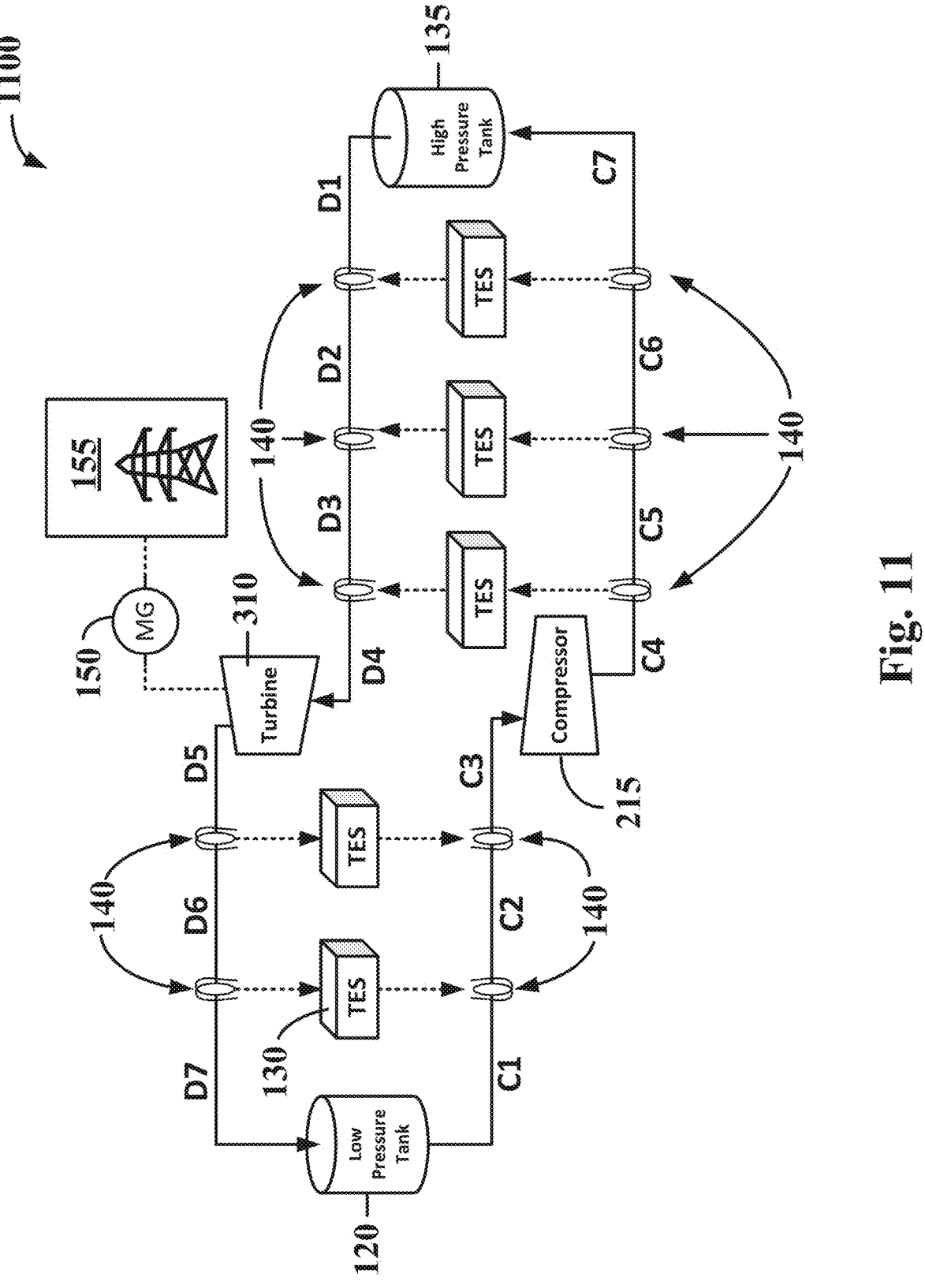
FIG. 11 is schematic diagram of a thermo-mechanical system that utilizes sequential pre-heating, heating, and cooling steps via one or more thermal energy storage units, in accordance with some embodiments.

In the following operational description of system 1100, reference will be made to FIGS. 11 and 12. During the charging cycle in system 1100, and more specifically in sub-sections C1 and C3, the low-pressure sCO$_2$ from the low-pressure tank 120 is successively heated in stages by one or more TES units 130 via one or more respective heat exchangers 140. By way of example and not limitation, the sCO$_2$ can be heated from about 19° C. to about 380° C., while the pressure of the sCO$_2$ is kept substantially constant (e.g., between about 910 psi and 1410 psi), as shown by the P-T diagram in FIG. 12. The heated sCO$_2$ is subsequently directed to compressor 215 where it is compressed (e.g., to a pressure from about 910 psi to about 3495 psi) as shown by the P-T diagram in FIG. 12. As discussed in earlier systems, the temperature of the compressed sCO$_2$ in sub-section C4 is elevated due to the compression process. For example, the temperature of the $sCO_2$ in sub-section C4 can be from about 100° C. to about 200° C. higher than that in sub-section C3.

Post compression, the heated $sCO_2$ undergoes a successive cooling in one or more stages, as shown by sub-sections C4-C7, so that a portion of the heat in $sCO_2$ is recovered and stored in one or more TES units 130 via respective heat exchangers 140. The temperature of the $sCO_2$ entering and/or inside the high-pressure tank 135 can be, for example, from about 20° C. to about 45° C. While the $sCO_2$ is being cooled in sub-sections C4-C7, the $sCO_2$ pressure can remain substantially constant, as shown by the P-T diagram in FIG. 12.

During the discharge cycle, and more specifically between sub-sections D1 and D4, the high-pressure $sCO_2$ from the high-pressure tank 135 is sequentially heated by one or more TES units 130 to a temperature from about 400° C. to about 600° C. At the same time, the $sCO_2$ pressure remains substantially unchanged as shown in FIG. 12. Subsequently, the $sCO_2$ passes through the expansion turbine 310 to generate electrical power via MG unit 150. The electricity produced by MG unit 150 can be dispatched to the power distribution grid 155. In some embodiments, the pressure drop across the expansion turbine 310 can be from about 1950 psi to about 2200 psi. The pressure drop between sub-sections D4 and D5 is shown schematically by the P-T diagram in FIG. 12. In some embodiments, the exhausted $sCO_2$ in sub-section D5 (e.g., after being exhausted by the expansion turbine 310) is at slightly lower temperature than in sub-section D4. Prior to reaching the low-pressure tank 120, the $sCO_2$ is cooled to a temperature from about 20° C. to about 45° C. via one or more cooling stages, as shown for sub-sections D5-D7. Notably, in sub-sections D5-D7 the pressure of $sCO_2$ remains substantially unchanged as shown by the P-T diagram in FIG. 12.

In some embodiments, the one or more TES units 130 used to pre-heat the $sCO_2$ in sub-sections C1-C3 during the charging cycle can be used to recover excess heat from the $sCO_2$ in sub-sections D5-D7 during the discharge cycle. Similarly, the one or more TES units 130 used to recover excess heat from the $sCO_2$ in sub-sections C4-C7 during the charge cycle can be used to pre-heat the $sCO_2$ in sub-sections D1-D4 during discharge cycle. This configuration reduces the cost of system 1100 because it efficiently utilizes the TES unit arrangement for different sub-sections of the charging the discharging cycles.

In some embodiments, fewer or additional TES units 130 may be used for the charging and discharging cycles described above without departing from the spirit and scope of the disclosure. Further, the TES units 130 used in sub-sections C1-C3 and D5-D7 can be different from one another. For example, one or more of the TES units 130 may contain a different type of thermal storage medium or heat transfer fluid (e.g., water, air, oil, mineral oil, silicone oil, glycol, molten salt, molten metal, etc.), compared to one or more other TES units. Similarly, the TES units 130 used in sub-sections C4-C7 may be different from the TES units 130 used in sub-sections D1-D4. According to some embodiments, the use of TES units 130 with different types of thermal storage mediums or heat transfer fluids can mitigate heat rejection and allow the heat conversion process (either via a heating or heat recovery process) to be as efficient as possible. Additionally or alternatively, the use of multiple TES units 130, as depicted, can enable desired temperatures and/or pressures to be achieved for the sub-sections (e.g., C1 through C7 and D1 through D7) in the system 1100. In some embodiments, the efficiency of system 1100 in transforming thermo-mechanical energy to electrical energy and vice versa is greater than about 70% (e.g., between about 70-75%, 75-80%, or 80-85%).

In some embodiments, one or more of the TES units 130 in the system 1100 can be configured to store thermal energy derived from a variety of energy sources, including, for example, renewable sources (e.g., the renewable energy grid 105 shown in FIG. 1), excess grid electricity, geothermal sources, and/or industrial sources (e.g., waste heat). In further embodiments, system 1100 can convert the energy stored in TES units 130 to electricity when demand is high and/or when renewable sources are unavailable.

Figure 12:
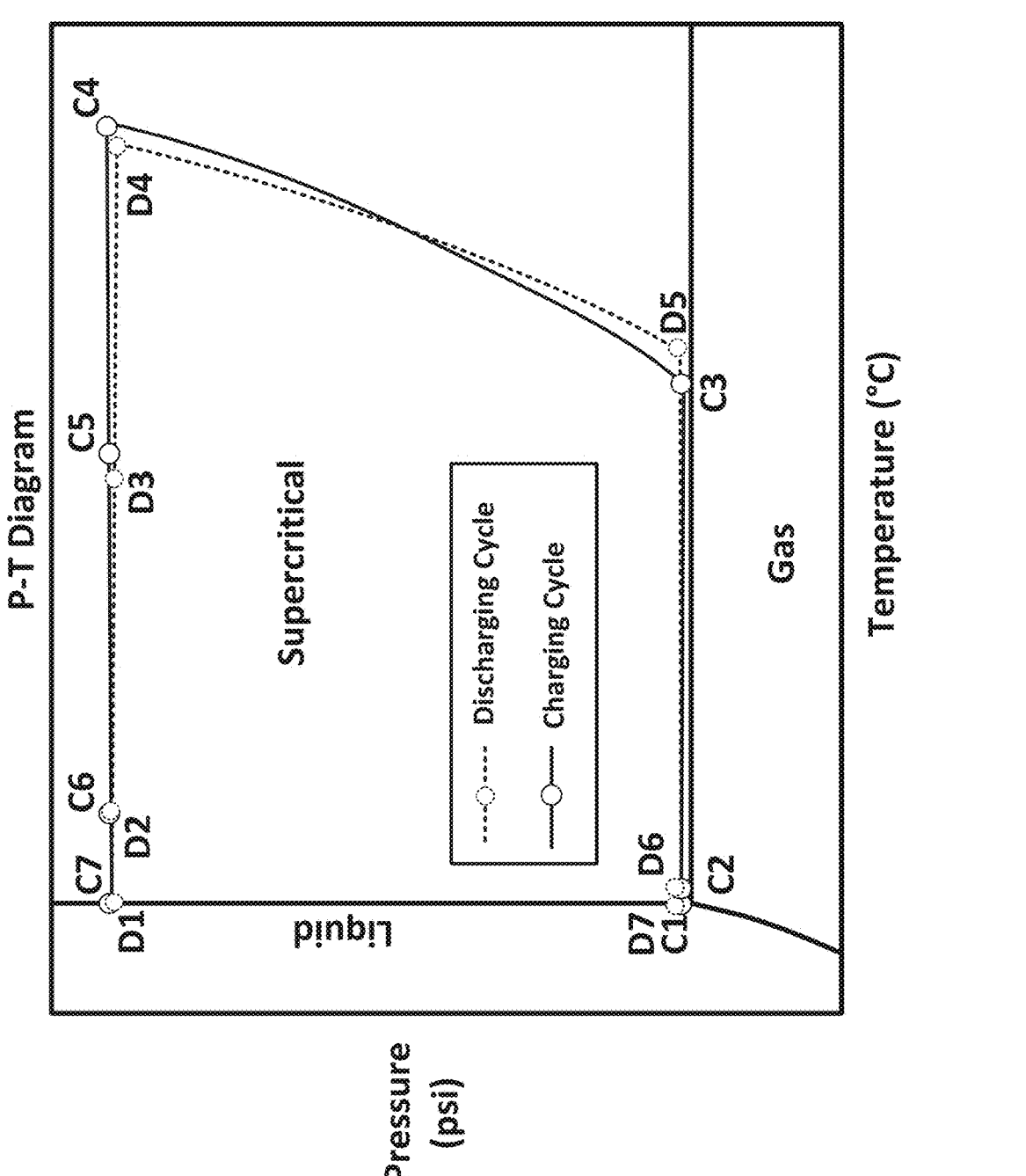
FIG. 12 is a carbon dioxide Pressure-Temperature diagram for the system of FIG. 11, in accordance with some embodiments.

Referring to FIG. 12, the $CO_2$ can be in a supercritical state throughout the system 1100. In some examples, the $CO_2$ in the low-pressure tank 120 may be in a liquid state; however, the $CO_2$ may return to a supercritical state when it exits the low-pressure tank 120 and/or is pre-heated.

Table 2 illustrates exemplary $CO_2$ temperature ranges for subsections C1 through C7 and D1 through D7 in the system 1100. Various embodiments include any parameter value (e.g., integer or decimal value) within the cited ranges, and each of these parameter values can represent an endpoint of a range. For example, the temperature in sub-section C1 can be greater than, less than, and/or equal to 19, 20, 21, . . . , 67, 68, or 69° C. The temperature in sub-section C2 can be, for example, greater than, less than, and/or equal to 21, 22, 23, . . . , 69, 70, or 71° C. The temperature in sub-section C3 can be, for example, greater than, less than, and/or equal to 330, 331, 332, . . . , 378, 379, or 380° C. The temperature in sub-section C4 can be, for example, greater than, less than, and/or equal to 465, 466, 467, . . . , 513, 514, or 515° C. The temperature in sub-section C5 can be, for example, greater than, less than, and/or equal to 268, 269, 270, . . . , 316, 317, or 318° C. The temperature in sub-section C6 can be, for example, greater than, less than, and/or equal to 60, 61, 62, . . . , 108, 109, or 110° C. The temperature in sub-section C7 can be, for example, greater than, less than, and/or equal to 20, 21, 22, . . . , 68, 69, or 70° C. The temperature in sub-section D1 can be, for example, greater than, less than, and/or equal to 20, 21, 22, . . . , 68, 69, or 70° C. The temperature in sub-section D2 can be, for example, greater than, less than, and/or equal to 67, 68, 69, . . . , 115, 116, or 117° C. The temperature in sub-section D3 can be, for example, greater than, less than, and/or equal to 272, 273, 274, . . . , 320, 321, or 322° C. The temperature in sub-section D4 can be, for example, greater than, less than, and/or equal to 454, 455, 456, . . . , 502, 503, or 504° C. The temperature in sub-section D5 can be, for example, greater than, less than, and/or equal to 334, 335, 336, . . . , 382, 383, or 384° C. The temperature in sub-section D6 can be, for example, greater than, less than, and/or equal to 21, 22, 23, . . . , 69, 70, or 71° C. The temperature in sub-section D7 can be, for example, greater than, less than, and/or equal to 19, 20, 21, . . . , 67, 68, or 69° C. Express support and written description of these parameter values for each parameter are hereby represented.

TABLE 2

| Exemplary temperatures for sub-sections C1 through C7 and D1 through D7. | | |
|---|---|---|
| Ingredient | Min. | Max. |
| Temperature in Sub-Section C1 (° C.) | 19 | 69 |
| Temperature in Sub-Section C2 (° C.) | 21 | 71 |

TABLE 2-continued

| Exemplary temperatures for sub-sections C1 through C7 and D1 through D7. | | |
|---|---|---|
| Ingredient | Min. | Max. |
| Temperature in Sub-Section C3 (° C.) | 330 | 380 |
| Temperature in Sub-Section C4 (° C.) | 465 | 515 |
| Temperature in Sub-Section C5 (° C.) | 268 | 318 |
| Temperature in Sub-Section C6 (° C.) | 60 | 110 |
| Temperature in Sub-Section C7 (° C.) | 20 | 70 |
| Temperature in Sub-Section D1 (° C.) | 20 | 70 |
| Temperature in Sub-Section D2 (° C.) | 67 | 117 |
| Temperature in Sub-Section D3 (° C.) | 272 | 322 |
| Temperature in Sub-Section D4 (° C.) | 454 | 504 |
| Temperature in Sub-Section D5 (° C.) | 334 | 384 |
| Temperature in Sub-Section D6 (° C.) | 21 | 71 |
| Temperature in Sub-Section D7 (° C.) | 19 | 69 |

Table 3 illustrates exemplary $CO_2$ pressure ranges for subsections C1 through C7 and D1 through D7 in the system 1100. Various embodiments include any parameter value (e.g., integer or decimal value) within the cited ranges, and each of these parameter values can represent an endpoint of a range. For example, the pressure in sub-section C1 can be greater than, less than, and/or equal to 920, 921, 922, . . . , 1418, 1419, or 1420 psi. The pressure in sub-section C2 can be, for example, greater than, less than, and/or equal to 915, 916, 917, . . . , 1413, 1414, or 1415 psi. The pressure in sub-section C3 can be, for example, greater than, less than, and/or equal to 910, 911, 912, . . . , 1408, 1409, or 1410 psi. The pressure in sub-section C4 can be, for example, greater than, less than, and/or equal to 2995, 2996, 2997, . . . , 3493, 3494, or 3495 psi. The pressure in sub-section C5 can be, for example, greater than, less than, and/or equal to 2990, 2991, 2992, . . . , 3488, 3489, or 3490 psi. The pressure in sub-section C6 can be, for example, greater than, less than, and/or equal to 2985, 2986, 2987, . . . , 3483, 3484, or 3485 psi. The pressure in sub-section C7 can be, for example, greater than, less than, and/or equal to 2980, 2981, 2982, . . . , 3478, 3479, or 3480 psi. The pressure in sub-section D1 can be, for example, greater than, less than, and/or equal to 2980, 2981, 2982, . . . , 3478, 3479, or 3480 psi. The pressure in sub-section D2 can be, for example, greater than, less than, and/or equal to 2975, 2976, 2977, . . . , 3473, 3474, or 3475 psi. The pressure in sub-section D3 can be, for example, greater than, less than, and/or equal to 2970, 2971, 2972, . . . , 3468, 3469, or 3470 psi. The pressure in sub-section D4 can be, for example, greater than, less than, and/or equal to 2965, 2966, 2967, . . . , 3463, 3464, or 3465 psi. The pressure in sub-section D5 can be, for example, greater than, less than, and/or equal to 929, 930, 931, . . . , 1427, 1428, or 1429 psi. The pressure in sub-section D6 can be, for example, greater than, less than, and/or equal to 924, 925, 926, 1422, 1423, or 1424 psi. The pressure in sub-section D7 can be, for example, greater than, less than, and/or equal to 920, 921, 922, . . . , 1418, 1419, or 1420 psi. Express support and written description of these parameter values for each parameter are hereby represented.

TABLE 3

| Exemplary pressures for sub-sections C1 through C7 and D1 through D7. | | |
|---|---|---|
| Ingredient | Min. | Max. |
| Pressure in Sub-Section C1 (psi) | 920 | 1420 |
| Pressure in Sub-Section C2 (psi) | 915 | 1415 |

TABLE 3-continued

| Exemplary pressures for sub-sections C1 through C7 and D1 through D7. | | |
|---|---|---|
| Ingredient | Min. | Max. |
| Pressure in Sub-Section C3 (psi) | 910 | 1410 |
| Pressure in Sub-Section C4 (psi) | 2995 | 3495 |
| Pressure in Sub-Section C5 (psi) | 2990 | 3490 |
| Pressure in Sub-Section C6 (psi) | 2985 | 3485 |
| Pressure in Sub-Section C7 (psi) | 2980 | 3480 |
| Pressure in Sub-Section D1 (psi) | 2980 | 3480 |
| Pressure in Sub-Section D2 (psi) | 2975 | 3475 |
| Pressure in Sub-Section D3 (psi) | 2970 | 3470 |
| Pressure in Sub-Section D4 (psi) | 2965 | 3465 |
| Pressure in Sub-Section D5 (psi) | 929 | 1429 |
| Pressure in Sub-Section D6 (psi) | 924 | 1424 |
| Pressure in Sub-Section D7 (psi) | 920 | 1420 |

In various examples, the temperatures and pressures shown in Tables 2 and 3 can be representative of the temperatures and pressures for any portions of the systems described herein. For example, the temperature and pressure before, after, and/or inside a low-pressure tank (e.g., low-pressure tank 120) or a pipeline (e.g., pipeline 605) can be as shown for sub-section C1 or D7 in Tables 2 and 3, respectively. Additionally or optionally, the temperature and pressure before, after, and/or inside a high-pressure tank (e.g., high-pressure tank 135) can be as shown for sub-section C7 or D1 in Tables 2 and 3, respectively. Additionally or optionally, the temperature and pressure of a $CO_2$ stream before a compression step (e.g., entering pump 125 or compressor 215) can be as shown for sub-section C1, C2, or C3 in Tables 2 and 3, respectively. Additionally or optionally, the temperature and pressure of a $CO_2$ stream after the compression step (e.g., exiting pump 125 or compressor 215) can be as shown for sub-section C4, C5, C6, or C7 in Tables 2 and 3, respectively. Additionally or optionally, the temperature and pressure of a $CO_2$ stream before an expansion step (e.g., entering turbine 125, turbine 205, turbine 220, or turbine 310) can be as shown for sub-section D1, D2, D3, or D4 in Tables 2 and 3, respectively. Additionally or optionally, the temperature and pressure of a $CO_2$ stream after the expansion step (e.g., exiting turbine 125, turbine 205, turbine 220, or turbine 310) can be as shown for sub-section D5, D6, or D7 in Tables 2 and 3, respectively.

In certain implementations, the system 1100 can be modified to utilize a $CO_2$ pipeline, as described herein. For example, the low-pressure tank 120 in system 1100 can be replaced with a $CO_2$ pipeline. Any other system components and/or operating parameters for the modified system can be as described herein for system 1100.

X. Thermal-Only Systems

Figure 13:
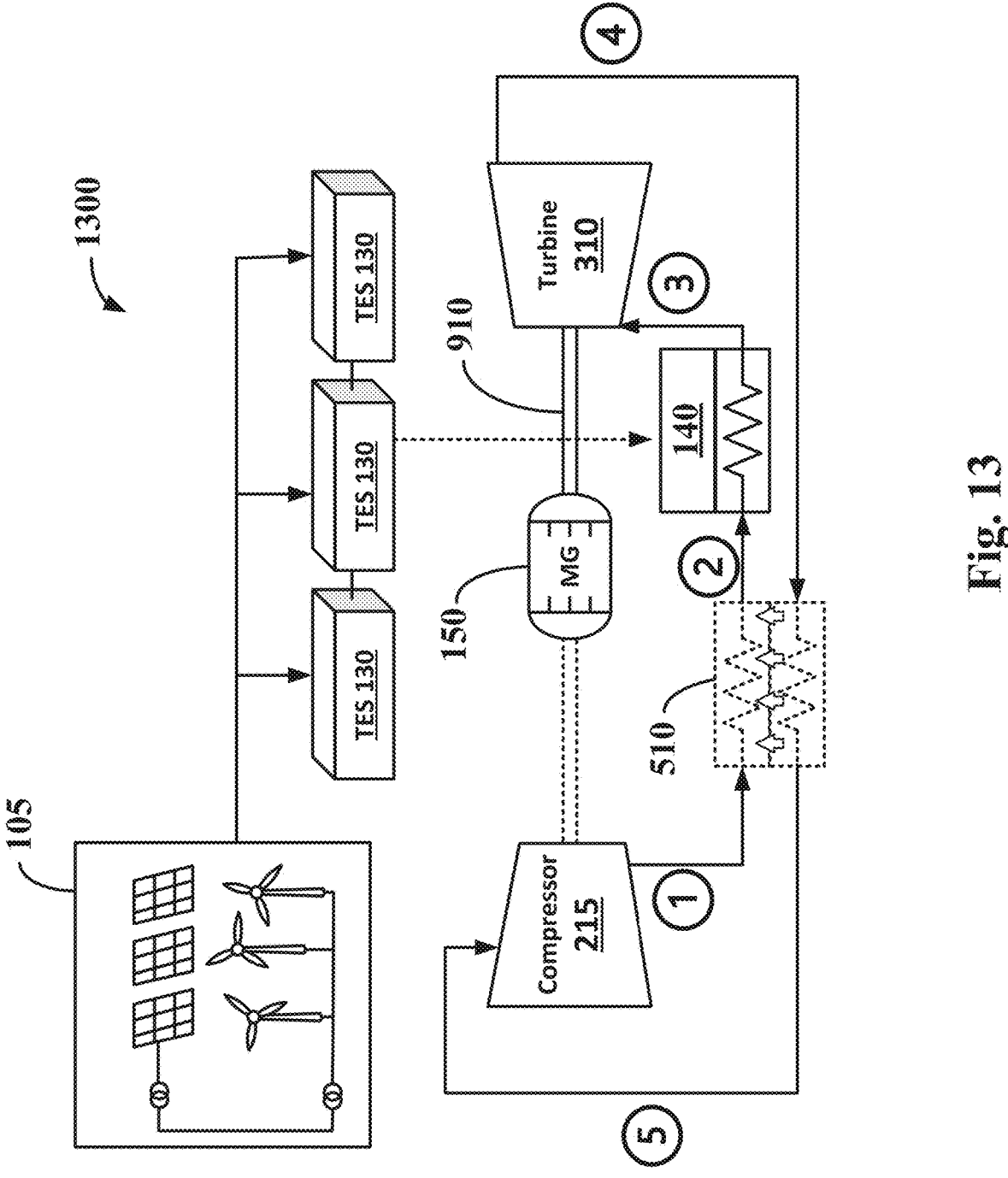
FIG. 13 is a schematic diagram of a thermal-only system for generating electricity, in accordance with some embodiments.

According to some embodiments, FIG. 13 is a schematic diagram of a "thermal-only" system 1300. For example, the system 1300, contrary to the system 1100 shown in FIG. 11, does not include low- and high-pressure tanks for $sCO_2$ storage and/or does not use pressurized $sCO_2$ stored in a tank to generate electricity. Instead, system 1100 is a closed-loop $sCO_2$ system where $sCO_2$ can be continuously circulated without being stored in a tank.

Notably, system 1300 resembles system 900 shown in FIG. 9; however, unlike system 900, system 1300 does not include $CO_2$ pipeline 605. For this reason, the $sCO_2$, when exhausted from turbine 310 in paths 4 and 5, is diverted directly to the entrance of compressor 215. Further, in system 1300, recuperator 510 may be optional and compressor 215 may not be mechanically linked to MG 150 via shaft 910 as shown in FIG. 9. Because recuperator 510 and the mechanical linkage between the MG 150 and the compressor 215 can be optional, the recuperator 510 and the shaft 910 between the MG 150 and the compressor 215 are represented with dashed lines.

According to some embodiments, the operation of system 1300 is similar to that of system 900, with the exception of $CO_2$ pipeline 605. For example, $sCO_2$ is compressed in compressor 215 and travels through paths 1-3 to the turbine 310. $sCO_2$ may optionally be pre-heated by recuperator 510, as discussed above, before the $sCO_2$ is further heated by TES units 130. TES units 130 can store thermal energy obtained from a variety of sources (e.g., the renewable energy grid 105), as described herein. Like previous systems (e.g., system 1100 in FIG. 11), system 1300 can convert thermal energy stored in TES units 130 to electricity, for example, when the renewable energy grid 105 is producing insufficient power or is inactive, or when there is high electrical demand.

The heated and pressurized $sCO_2$ expands across turbine 310, which turns MG 150. Upon exiting the turbine 310 in path 4, the $sCO_2$ is at a lower pressure and temperature compared to path 3. The exhausted $sCO_2$, however, may still carry residual heat that can be recovered by the optional recuperator 510. The exhausted $sCO_2$ exits the recuperator 510 via path 5 and returns to the compressor 215 to complete another cycle.

As discussed for system 900, production of electricity in system 1300 is achieved by MG unit 150, which is mechanically linked via shaft 910 to turbine 310, and optionally to compressor 215. In some embodiments, the compressor 215 can be initially powered by the MG unit 150 until the turbine 310 can generate enough power to take over the operation of compressor 215, or the compressor 215 may be initially powered by an external power source such as the renewable energy grid 105, a battery pack (not shown), or the power distribution grid 155 (not shown).

Modifications for system 1300 are possible and within the spirit and the scope of this disclosure. For example, in system 1300, the compressor 215 and turbine 310 may be combined into a single PT unit, such as PT unit 125 shown in FIG. 1. In this configuration, for example, MG 150 can be connected via shaft 910 to the PT unit, and the PT unit can operate as a compressor when the $sCO_2$ flows in one direction, and operate as a turbine when the $sCO_2$ flows in the opposite direction, as described for system 100 in FIG. 1.

In some embodiments, the thermo-mechanical system 1100 can be more efficient than the thermal-only system 1300. By way of example and not limitation, the thermo-mechanical system 1100 can be about 67% more efficient than the thermal-only system 1300. However, because thermal-only system 1300 does not require the high-pressure and low-pressure tanks, it can have a lower capital cost.

XI. Metal-Mesh Enhanced, Phase Change Material, Thermal Energy Storage Unit

Various embodiments of the systems and methods discussed herein utilize a thermal energy storage unit (e.g., TES unit 130) for storing heat. A variety of techniques or materials can be used to store heat, including, for example, molten salt, tanks or rock caverns, hot silicon, molten aluminum, rocks, concrete, water, oil, other liquids, phase change materials (e.g., metals), a geothermal rock strata, or any combination thereof.

Figures 14A, 14B, 14C:
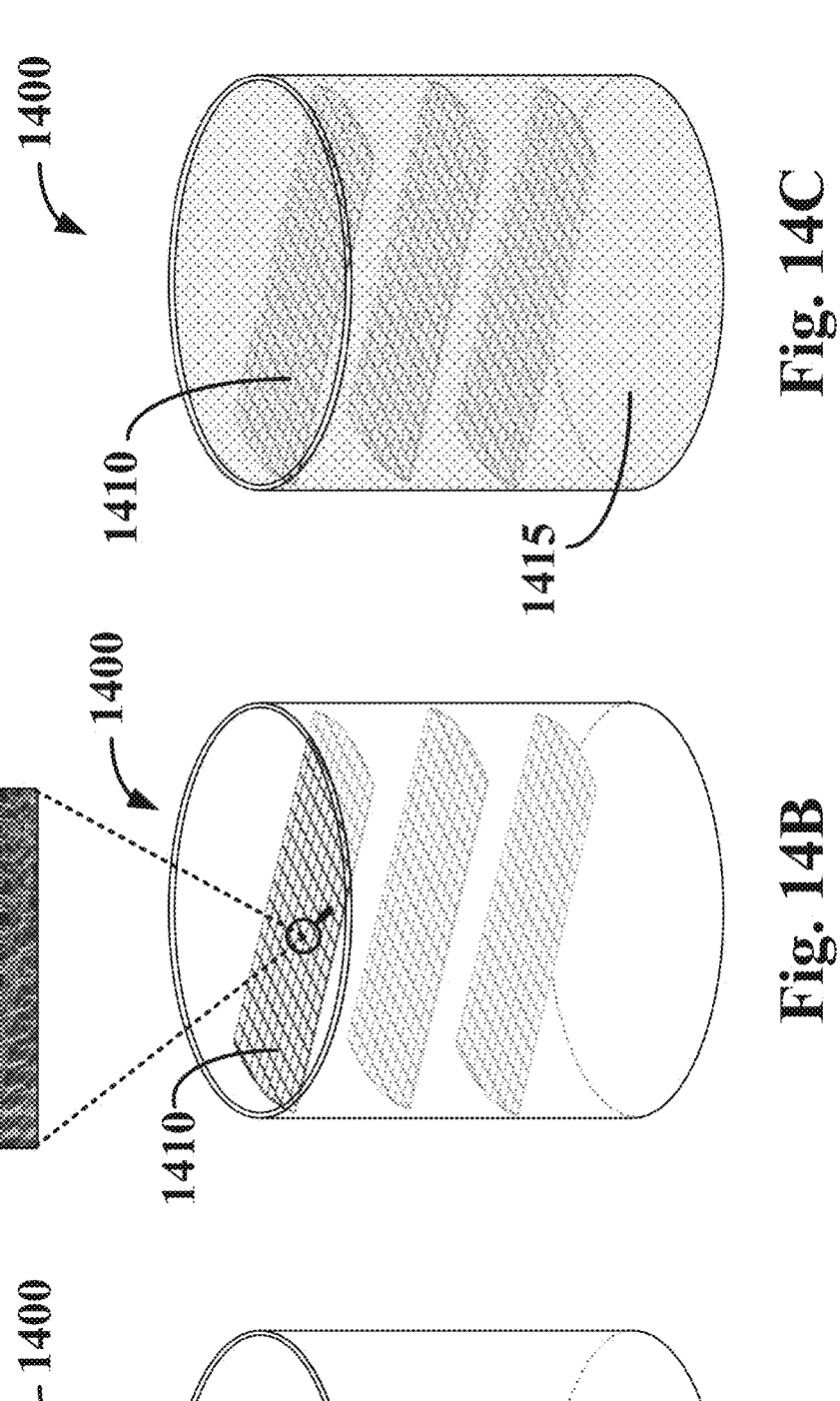
FIG. 14A shows an exemplary container for a thermal storage unit, in accordance with some embodiments.
FIG. 14B shows meshes disposed within a container of a thermal storage unit, in accordance with some embodiments.
FIG. 14C shows meshes surrounded by a phase change material within a container of a thermal storage unit, in accordance with some embodiments.

In certain examples, the TES unit described herein can utilize a metal-mesh enhanced, phase change material (PCM) with high thermal conductivity. The TES unit may have any suitable shape, including, for example, cylindrical, cubical, spherical, conical, or any combination thereof. For example, the TES unit may have a cylindrical outer shell with dome-shaped end portions. FIGS. 14A-14C show an exemplary TES unit 1400 having a cylindrical container shell 1405 with flat end portions. Container shell 1405 may be made from stainless steel and include an insulating material to thermally insulate the contents of the TES unit 1400 and prevent heat leaks.

Referring to FIG. 14B, TES unit 1400 may contain one or more meshes 1410, which can be planar and/or can occupy one or more regions within the TES unit 1400. In the depicted example, multiple meshes 1410 are positioned at different locations along a central axis of the TES unit 1400. The meshes 1410 can be made of a material or materials that exhibit high thermal conductivity, good malleability and ductility, and are non-magnetic and non-sparking. By way of example and not limitation, meshes 1410 can be made of aluminum metal, which is the second most malleable metal and the sixth most ductile, and has a thermal conductivity of about 247 W/(m-K). According to some embodiments, the number of meshes 1410 can be variable, and in some implementations, the meshes 1410 can be welded at different heights within the container shell 1405. A magnified view of the mesh's surface is shown in inset A of FIG. 14B.

In some embodiments, a PCM 1415 is poured inside the container to completely fill the empty space between the meshes 1410 as shown in FIG. 14C. By way of example and not limitation, the PCM 1415 can include one or more solar salts, such as sodium (Na) or potassium (K) nitrides, depending on temperature requirements. In some implementations, the PCM 1415 may exhibit lower conductivity than that of the mesh material, which can result in slower charging and discharging times for the resulting TES unit 1400. In general, a higher heat conductivity for the PCM can achieve a quicker the response time, which may be desirable for some applications.

According to certain embodiments, the mesh material has a melting temperature well above the phase transition temperature of the PCM 1415. For example, when the PCM 1415 has a phase transition temperature of about 500° C., the mesh material can have a melting point greater than about 550° C., about 600° C., or about 650° C. The mesh material preferably does not chemically react with the PCM 1415 or other components of the TES unit 1400 over a wide range of temperatures, including an operational temperature range of the TES unit 1400.

In some examples, the container shell 1405 may feature one or more conduits (not shown) that traverse through a center or any other portion of the TES unit 1400 to form pathways for a heat exchange fluid, which can be pumped through the conduits to transfer heat to or from the PCM 1415. In some implementations, one or more components of the TES unit 1400 may be printed using direct metal three-dimensional (3-D) printing methods.

In general, the TES unit 1400 can store energy by transferring heat to the PCM 1415, which can increase in temperature and/or change phase (e.g., melt) as the temperature increases. The heat can be obtained or derived from a variety of sources, including, for example, electrical sources (e.g., renewable energy grid 105, solar energy, wind energy, etc.), thermal sources (e.g., geothermal sources, waste heat from an industrial process), or the like. Heat can be removed from the TES unit 1400 using a heat exchanger or similar device, as described herein.

XII. Some Embodiments

Some embodiments may include any of the following:

A1. A power generation system includes a compressor operable to receive $sCO_2$ and produce compressed $sCO_2$, one or more TES units operable to heat the compressed $sCO_2$, a turbine operable to receive the heated and compressed $sCO_2$ and output an $sCO_2$ exhaust, and at least one of a generator or a propeller coupled to the turbine, where the generator is operable to produce electricity and the propeller is operable to produce thrust.

A2. The system of clause A1 can include any of the following components or features, in any combination. The system can include the generator coupled to the turbine. The system can include at least one heat exchanger operable to transfer heat from the one or more TES units to the compressed $sCO_2$. The system can include at least one recuperator configured to transfer heat from the $sCO_2$ exhaust to the compressed $sCO_2$. The system can include a pipeline configured to provide $sCO_2$ for the compressor and receive the $sCO_2$ exhaust from the turbine. The system can include a low-pressure tank configured to provide $sCO_2$ for the compressor and receive the $sCO_2$ exhaust from the turbine. The system can include a high-pressure tank configured to store the compressed $sCO_2$. The system can include at least one heat exchanger configured to transfer heat from at least one of the compressed $sCO_2$ or the exhaust $sCO_2$ to the one or more TES units. The system can include: a low-pressure tank configured to provide $sCO_2$ for the compressor and receive the $sCO_2$ exhaust from the turbine; and a high-pressure tank configured to store the compressed $sCO_2$. The system can include a plurality of TES units operable to (i) receive heat from the $sCO_2$ exhaust and (ii) provide heat to an $sCO_2$ stream output from the low-pressure tank, where the one or more TES units include at least two TES units operable to (i) receive heat from an $sCO_2$ stream output from the compressor and (ii) provide heat to an $sCO_2$ stream output from the high-pressure tank. The plurality of TES units can be coupled to a first set of heat exchangers configured to cool the $sCO_2$ exhaust and heat the $sCO_2$ stream output from the low-pressure tank in stages, and the at least two TES units can be coupled to a second set of heat exchangers configured to cool the $sCO_2$ stream output from the compressor and heat the $sCO_2$ stream output from the high-pressure tank in stages. The compressor and the turbine can be disposed in a single pump-turbine unit. The one or more TES units can include a geothermal rock strata. The one or more TES units can include a phase change material and optionally a mesh disposed within the phase change material. The system can include at least one processor programmed to utilize a predictive model for determining optimal charging and discharging cycles for the system.

A3. A method of generating power includes compressing $sCO_2$ using a compressor, heating the compressed $sCO_2$ using one or more TES units, providing the heated and compressed $sCO_2$ to a turbine where the turbine is outputting an $sCO_2$ exhaust, and producing at least one of (i) electricity using a generator coupled to the turbine or (ii) thrust using a propeller coupled to the turbine.

A4. The method of clause A3 can include any of the following components or features, in any combination. The method can include transferring heat from the $sCO_2$ exhaust to the compressed $sCO_2$ using at least one recuperator. The method can include providing $sCO_2$ to the compressor using at least one of a pipeline and a low-pressure tank. The method can include storing the compressed $sCO_2$ using a high-pressure tank. The method can include: using a plurality of TES units to (i) receive heat from the $sCO_2$ exhaust and (ii) provide heat to an $sCO_2$ stream output from the low-pressure tank; and using the one or more TES units to (i) receive heat from an $sCO_2$ stream output from the compressor and (ii) provide heat to an $sCO_2$ stream output from the high-pressure tank. The compressor and the turbine can be disposed in a single pump-turbine unit. The one or more TES units can include at least one of a geothermal rock strata or a mesh disposed within a phase change material.

A5. A thermo-mechanical system includes a pipeline containing $sCO_2$, a compressor operable to compress $sCO_2$ diverted from the pipeline, one or more TES units operable to heat the compressed $sCO_2$ via a heat exchanger, a turbine operable to receive the heated and compressed $sCO_2$ and to exhaust the $sCO_2$ back to the pipeline, where the turbine and the compressor are coupled to a generator via a common shaft. The thermo-mechanical system further includes a recuperator operable to transfer heat from the exhausted $sCO_2$ exiting the turbine to the compressed $sCO_2$ exiting the compressor.

A6. The system of clause A5 can include any of the following components or features, in any combination. The motor generator can be operable to produce electrical energy when the heated and compressed $sCO_2$ passes through the turbine. The one or more TES units can include at least one of a geothermal rock strata or a mesh disposed within a phase change material.

A7. A thermo-mechanical system includes a low-pressure tank configured to store $sCO_2$, a compressor operable to receive and compress the $sCO_2$ from the low-pressure tank, a high-pressure tank configured to store the compressed $sCO_2$ from the compressor, a turbine operable to receive the compressed $sCO_2$ from the high-pressure tank and produce an $sCO_2$ exhaust for storage in the low-pressure tank. The thermos-mechanical system further includes a first set of TES units operable to (i) transfer heat from the $sCO_2$ exhaust from the turbine and (ii) transfer heat to the $sCO_2$ from the low-pressure tank, and a second set of TES units operable to (i) transfer heat from the compressed $sCO_2$ exiting the compressor and (ii) transfer heat to the $sCO_2$ exiting the high-pressure tank.

A8. The system of clause A7 can include any of the following components or features, in any combination. The first set of TES units can be configured to heat the $sCO_2$ from the low-pressure tank in stages, and the second set of TES units can be configured to heat the $sCO_2$ exiting the high-pressure tank in stages. At least one TES unit from the first set of TES units or the second set of TES units can be configured to store heat derived from a renewable energy source. The system can include at least one of a generator or a propeller coupled to the turbine, the generator is operable to produce electricity and the propeller operable to produce thrust.

XIII. Additional Considerations

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Although the concepts and principles of operation for systems 100-900 have been described with limited number of components for simplicity, these systems may include additional electrical and/or mechanical components necessary for their operation. Such components may include, but are not limited to, pipes, pipe connectors, pressure regulators, different types of valves, computers, electronic controllers, transformers, gears, power supplies, electrical control panels, etc. These additional components are within the spirit and the scope of this disclosure.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Additionally, systems 100-900 as described herein are modular, which means that one or more systems or their individual components may be added together (e.g., in series) to increase the power output of the resulting system. For example, systems 100-900 may feature one or more high-pressure tanks, one or more low-pressure tanks, one or more turbines, one or more compressors, one or more TES units, one or more MG units, etc. Further, permutations, combinations, and modification that may result in simpler or more efficient versions of the systems disclosed herein are within the spirit and the scope of this disclosure. For example, as discussed for several systems, the compressor and turbine functions may be combined, and/or that different types of turbines may be combined into a single unit to reduce the cost and footprint of the resulting system.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some embodiments, aspects of the systems and methods described herein may be implemented using ML and/or AI technologies.

"Machine learning" generally refers to the application of certain techniques (e.g., pattern recognition and/or statistical inference techniques) by computer systems to perform specific tasks. Machine learning techniques may be used to build models based on sample data (e.g., "training data") and to validate the models using validation data (e.g., "testing data"). The sample and validation data may be organized as sets of records (e.g., "observations" or "data samples"), with each record indicating values of specified data fields (e.g., "independent variables," "inputs," "features," or "predictors") and corresponding values of other data fields (e.g., "dependent variables," "outputs," or "targets"). Machine learning techniques may be used to train models to infer the values of the outputs based on the values of the inputs. When presented with other data (e.g., "inference data") similar to or related to the sample data, such models may accurately infer the unknown values of the targets of the inference data set.

As used herein, "model" may refer to any suitable model artifact generated by the process of using a machine learning algorithm to fit a model to a specific training data set. The terms "model," "data analytics model," "machine learning model" and "machine learned model" are used interchangeably herein.

As used herein, the "development" of a machine learning model may refer to construction of the machine learning model. Machine learning models may be constructed by computers using training data sets. Thus, "development" of a machine learning model may include the training of the machine learning model using a training data set. In some cases (generally referred to as "supervised learning"), a training data set used to train a machine learning model can include known outcomes (e.g., labels or target values) for individual data samples in the training data set. For example, when training a supervised computer vision model to detect images of cats, a target value for a data sample in the training data set may indicate whether or not the data sample includes an image of a cat. In other cases (generally referred to as "unsupervised learning"), a training data set does not include known outcomes for individual data samples in the training data set.

Following development, a machine learning model may be used to generate inferences with respect to "inference" data sets. For example, following development, a computer vision model may be configured to distinguish data samples including images of cats from data samples that do not include images of cats. As used herein, the "deployment" of a machine learning model may refer to the use of a developed machine learning model to generate inferences about data other than the training data.

"Artificial intelligence" (AI) generally encompasses any technology that demonstrates intelligence. Applications (e.g., machine-executed software) that demonstrate intelligence may be referred to herein as "artificial intelligence applications," "AI applications," or "intelligent agents." An intelligent agent may demonstrate intelligence, for example, by perceiving its environment, learning, and/or solving problems (e.g., taking actions or making decisions that increase the likelihood of achieving a defined goal). In many cases, intelligent agents are developed by organizations and deployed on network-connected computer systems so users within the organization can access them. Intelligent agents are used to guide decision-making and/or to control systems in a wide variety of fields and industries, e.g., security; transportation; risk assessment and management; supply chain logistics; and energy management. Intelligent agents may include or use models.

Some non-limiting examples of AI application types may include inference applications, comparison applications, and optimizer applications. Inference applications may include any intelligent agents that generate inferences (e.g., predictions, forecasts, etc.) about the values of one or more output variables based on the values of one or more input variables. In some examples, an inference application may provide a recommendation based on a generated inference. For example, an inference application for a lending organization may infer the likelihood that a loan applicant will default on repayment of a loan for a requested amount, and may recommend whether to approve a loan for the requested amount based on that inference. Comparison applications may include any intelligent agents that compare two or more possible scenarios. Each scenario may correspond to a set of potential values of one or more input variables over a period of time. For each scenario, an intelligent agent may generate one or more inferences (e.g., with respect to the values of one or more output variables) and/or recommendations. For example, a comparison application for a lending organization may display the organization's predicted revenue over a period of time if the organization approves loan applications if and only if the predicted risk of default is less than 20% (scenario #1), less than 10% (scenario #2), or less than 5% (scenario #3). Optimizer applications may include any intelligent agents that infer the optimum values of one or more variables of interest based on the values of one or more input variables. For example, an optimizer application for a lending organization may indicate the maximum loan amount that the organization would approve for a particular customer.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A power generation system, comprising:

a source of carbon dioxide ($CO_2$);

a high-pressure tank;

a pump-turbine unit operable to perform a charging step and a discharging step, the charging step comprising (i) receiving at a first location of the pump-turbine unit a first stream of $CO_2$ from the source of $CO_2$ and (ii) releasing at a second location of the pump-turbine unit a second stream of compressed $CO_2$ received by the high-pressure tank, the discharging step comprising (i) receiving at the second location of the pump-turbine unit a third stream of $CO_2$ from the high-pressure tank and (ii) releasing at the first location of the pump-turbine unit a fourth stream of $CO_2$ exhaust received by the source of $CO_2$;

at least one thermal energy storage (TES) unit;

at least one heat exchanger operable to exchange heat between the at least one TES unit and at least one of the first stream, the second stream, the third stream, or the fourth stream; and at least one of a generator or a propeller coupled to the pump-turbine unit, the generator operable to produce electricity and the propeller operable to produce thrust, wherein the pump-turbine unit is configured to operate as a pump or a compressor during the charging step and as a turbine during the discharging step.

2. The power generation system of claim 1, wherein the source of $CO_2$ comprises a low-pressure tank, and wherein a pressure in the low-pressure tank prior to the charging step is from 1000 psi to 1200 psi.

3. The power generation system of claim 1, wherein the source of $CO_2$ comprises a pipeline, and wherein the pipeline transports $CO_2$ captured from an industrial facility.

4. The power generation system of claim 1, wherein the pump-turbine unit is powered by a renewable energy source to produce the compressed $CO_2$ in the second stream.

5. The power generation system of claim 1, wherein the pump-turbine unit comprises a compressor-turbine unit.

6. The power generation system of claim 1, wherein the compressed $CO_2$ is in a supercritical state.

7. The power generation system of claim 1, wherein:

the first stream travels along a first flow path during the charging step, the second stream travels along a second flow path during the charging step, the third stream travels along the second flow path during the discharging step, and the fourth stream travels along the first flow path during the discharging step.

8. The power generation system of claim 1, wherein the at least one heat exchanger is configured to (i) transfer heat from the second stream to the at least one TES unit during the charging step and (ii) transfer heat from the at least one TES unit to the third stream during the discharging step.

9. The power generation system of claim 1, wherein the power generation system comprises the generator.

10. The power generation system of claim 1, wherein the power generation system comprises the propeller.

11. The power generation system of claim 1, further comprising a valve operable to prevent the compressed $CO_2$ from leaving the high-pressure tank.

12. A method of generating power, the method comprising:

performing a charging step comprising:

providing a first stream of carbon dioxide ($CO_2$) from a source of $CO_2$ to a first location of a pump-turbine unit;

compressing the first stream in the pump-turbine unit to produce a second stream of compressed $CO_2$; and providing the second stream from a second location of the pump-turbine unit to a high-pressure tank;

performing a discharging step comprising:

providing a third stream of $CO_2$ from the high-pressure tank to the second location of the pump-turbine unit;

expanding the third stream in the pump-turbine unit to produce a fourth stream of $CO_2$ exhaust; and providing the fourth stream from the first location of the pump-turbine unit to the source of $CO_2$;

using at least one heat exchanger to exchange heat between at least one thermal energy storage (TES) unit and at least one of the first stream, the second stream, the third stream, or the fourth stream; and producing at least one of (i) electricity using a generator coupled to the pump-turbine unit or (ii) thrust using a propeller coupled to the pump-turbine unit, wherein the pump-turbine unit is configured to operate as a pump or a compressor during the charging step and as a turbine during the discharging step.

13. The method of claim 12, wherein the source of $CO_2$ comprises a low-pressure tank, and wherein a pressure in the low-pressure tank prior to the charging step is from 1000 psi to 1200 psi.

14. The method of claim 12, wherein the source of $CO_2$ comprises a pipeline, and wherein the pipeline transports $CO_2$ captured from an industrial facility.

15. The method of claim 12, wherein the pump-turbine unit is powered by a renewable energy source to produce the compressed $CO_2$.

16. The method of claim 12, wherein the $CO_2$ is in a supercritical state.

17. The method of claim 12, wherein:

the first stream travels along a first flow path during the charging step, the second stream travels along a second flow path during the charging step, the third stream travels along the second flow path during the discharging step, and the fourth stream travels along the first flow path during the discharging step.

18. The method of claim 12, wherein the at least one heat exchanger is configured to (i) transfer heat from the second stream to the at least one TES unit during the charging step and (ii) transfer heat from the at least one TES unit to the third stream during the discharging step.

19. The method of claim 12, wherein the method comprises producing the electricity using the generator coupled to the pump-turbine unit.

20. The method of claim 12, wherein the method comprises producing the thrust using the propeller coupled to the pump-turbine unit.

21. The method of claim 12, further comprising closing a valve to prevent the compressed $CO_2$ from leaving the high-pressure tank.

22. The power generation system of claim 1, wherein a pressure in the high-pressure tank after the charging step is from 2980 psi to 3480 psi.

* * * * *